(12) United States Patent  (10) Patent No.: US 8,475,031 B1
Chen  (45) Date of Patent: Jul. 2, 2013

(54) LED BACKLIGHT MODULE STRUCTURE FOR INCREASING PROCESS YIELD

(75) Inventor: Tsan-Jung Chen, New Taipei (TW)

(73) Assignee: Kocam International Co., Ltd. (TW)

( * ) Notice: Subject to any disclaimer, the term of this patent is extended or adjusted under 35 U.S.C. 154(b) by 86 days.

(21) Appl. No.: 13/342,321

(22) Filed: Jan. 3, 2012

(51) Int. Cl.
*F21V 7/04* (2006.01)

(52) U.S. Cl.
USPC .......... 362/612; 362/600; 362/611; 362/613; 362/615

(58) Field of Classification Search
None
See application file for complete search history.

(56) References Cited

U.S. PATENT DOCUMENTS

| | | | |
|---|---|---|---|
| 7,345,320 B2* | 3/2008 | Dahm | 257/99 |
| 7,380,961 B2* | 6/2008 | Moriyama et al. | 362/238 |
| 7,863,641 B2* | 1/2011 | Dahm | 257/99 |
| 8,434,909 B2* | 5/2013 | Nichol et al. | 362/296.01 |
| 2004/0252501 A1* | 12/2004 | Moriyama et al. | 362/238 |
| 2005/0231983 A1* | 10/2005 | Dahm | 362/800 |
| 2007/0228392 A1* | 10/2007 | Plank et al. | 257/79 |
| 2008/0094841 A1* | 4/2008 | Dahm | 362/294 |
| 2010/0220472 A1* | 9/2010 | Dahm | 362/231 |
| 2011/0255303 A1* | 10/2011 | Nichol et al. | 362/606 |
| 2011/0273906 A1* | 11/2011 | Nichol et al. | 362/607 |

* cited by examiner

*Primary Examiner* — Natalie Walford

(57) ABSTRACT

LED backlight module structure for increasing process yield comprises a housing, a copper circuit layer, a plurality of LED chips, a plurality of solder paste overflow prevention members, a light guide plate, and a bottom reflector. In the present invention, it mainly disposed the solder paste overflow prevention members between the LED chips and the copper circuit layer, therefore, the solder paste overflow phenomenon is prevented when using a pressing fixture to assist in executing the welding process of LED chips, and it ensures that the soldering pins of the LED chips would not electrically connect to each other due to the solder paste overflow phenomenon. Moreover, a position limiting band can be further disposed on the copper circuit layer for receiving and fixing the LED chips, in addition, the position limiting band is helpful to the LED chips in heat dissipation when the LED chips emit light.

38 Claims, 24 Drawing Sheets

LED BACKLIGHT MODULE STRUCTURE FOR INCREASING PROCESS YIELD

BACKGROUND OF THE INVENTION

1. Technical Field

The present invention relates to a backlight module structure, and more particularly, to an LED backlight module structure for increasing process yield.

2. Description of Related Art

Light-emitting diodes (LEDs) are the widely used light-emitting devices. The LED has the advantages of small volume and lone lifetime, so that it is widely used in human life.

Recently, LEDs are also applied in backlight module. Please refer to FIG. 1, which illustrates a stereo diagram of a conventional LED backlight module. As shown in FIG. 1, the conventional LED backlight module 1' includes: a housing 11', a copper circuit layer 12', a plurality of LED chips 13', a reflector 14, a light guide plate 15, and a bottom reflector 16', wherein the housing 11' includes a housing bottom 111', and the copper circuit layer 12' is disposed on the hosuing bottom 111' through a thermally conductive insulating layer. Please refer to FIG. 2, there is shown a stereo diagram of the LED chip. As shown in FIG. 2, a plurality of welding pins are exposed out of the package 130' of the LED chip 13', including positive welding pins 131' and negative welding pins 132'; and LED chip 13' has a light-emitting surface 134' in the top thereof.

Referring to FIG. 2 again, and please simultaneously refer to FIG. 3A, FIG. 3B and FIG. 3C, there are shown schematic welding processes diagram of the LED chips. As shown in FIG. 3A, when executing the welding process of the LED chips 13', an LED carrier 3' is general used for carrying the LED chips 13' and putting the LED chips 13' on the surface of the copper circuit layer 12', and then, as shown in FIG. 3B, the positive welding pins 131' and the negative welding pins 132' contact with the welding points 122' of the copper circuit layer 12', wherein the solder is disposed on the welding points 122' in advance. Continuously, as shown in FIG. 3C, a pressing fixture 2' is used for pressing the LED chips 13', and then the housing 11' is heat for melting the solder on the welding points 122', so as to weld the positive welding pins 131' and the negative welding pins 132' on the welding points 122'.

The aforesaid LED backlight module 1' is widely used in liquid crystal display, in addition, the pressing fixture 2' levels all the LED chips 13' on the copper circuit layer 12' when the welding process is executed, such that the backlight quality of the LED backlight module 1' is good. Even so, the LED backlight module 1' still includes the drawbacks and the shortcomings as follows:

1. When executing the welding process of the LED chips 13', the solder paste overflow phenomenon may occur between the bottoms of the LED chips 13' and the copper circuit layer 12', and cause the positive welding pins 131' electrically connect to the negative welding pins 132', such that some LED chips 13' may fail to normally work.
2. Inheriting to above point 1, furthermore, the solder paste overflow phenomenon may directly influence the process yield of the LED backlight module 1'.

Accordingly, in view of the conventional LED backlight module still has shortcomings and drawbacks, the inventor of the present application has made great efforts to make inventive research thereon and eventually provided an LED backlight module structure for increasing process yield.

BRIEF SUMMARY OF THE INVENTION

The first objective of the present invention is to provide an LED backlight module structure for increasing process yield, in which a plurality of solder paste overflow prevention members is disposed between the LED chips and the copper circuit layer, therefore, the solder paste overflow phenomenon can be prevented when using a pressing fixture to assist in executing the welding process of LED chips, and then it can make sure that the soldering pins of the LED chips would not electrically connect to each other due to the solder paste overflow phenomenon.

Accordingly, to achieve the first objective of the present invention, the inventor proposes an LED backlight module structure for increasing process yield, comprising:

a housing;

a copper circuit layer, disposed on the surface of a circuit-disposing portion of the housing through a thermally conductive insulating layer, wherein the copper circuit layer has at least one main circuit and a plurality of soldering point;

a plurality of LED chips, having a plurality of soldering pins and a light-emitting surface on the bottoms and the tops thereof, wherein the plurality of LED chips are disposed on the copper circuit layer, and the soldering pins being welded to the soldering points;

a plurality of solder paste overflow prevention members, disposed between the LED chips and the copper circuit layer;

a light guide plate, disposed in the housing, and a light-receiving surface of the light guide plate is opposite to the light-emitting surfaces of the LED chips; and a bottom reflector, disposed on the bottom of the light guide plate for preventing light leakage.

The second objective of the present invention is to provide an LED backlight module structure for increasing process yield, in which a plurality of solder paste overflow prevention members is disposed between the LED chips and the copper circuit layer, moreover, the copper circuit layer and the solder paste overflow prevention members are disposed on the outer surface of the housing for meeting the demands from different structure design of LED backlight module.

So that, to achieve the second objective of the present invention, the inventor proposes an LED backlight module structure for increasing process yield, comprising:

a housing, having at least one circuit-disposing portion, and the circuit-disposing portion has a plurality of disposing holes;

a circuit substrate;

a copper circuit layer, disposed on the surface of the circuit substrate through a thermally conductive insulating layer, wherein the copper circuit layer has at least one main circuit and a plurality of soldering point;

a plurality of LED chips, having a plurality of soldering pins and a light-emitting surface on the bottoms and the tops thereof, wherein the plurality of LED chips are disposed on the copper circuit layer, and the soldering pins are welded to the soldering points; moreover, the circuit substrate is attached to the outer surface of the circuit-disposing portion via another thermally conductive insulating layer, such that the LED chips can respectively pass through the disposing holes and enter the interior of the housing from the outer surface of the circuit-disposing portion;

a plurality of solder paste overflow prevention members, disposed between the LED chips and the copper circuit layer;

a light guide plate, disposed in the housing, and a light-receiving surface of the light guide plate being opposite to the light-emitting surfaces of the LED chips; and a bottom reflector, disposed on the bottom of the light guide plate for preventing light leakage.

The third objective of the present invention is to provide an LED backlight module structure for increasing process yield, in which a position limiting band is disposed on the copper circuit layer for receiving and fixing the LED chips, such that the position limiting band can assist the LED chips in heat dissipation when the LED chips emit light.

Thus, to achieve the third objective of the present invention, the inventor proposes an LED backlight module structure for increasing process yield, comprising:

a housing;

a copper circuit layer, disposed on the surface of a circuit-disposing portion of the housing through a thermally conductive insulating layer, wherein the copper circuit layer has at least one main circuit and a plurality of soldering point;

a plurality of LED chips, having a plurality of soldering pins and a light-emitting surface on the bottoms and the tops thereof, wherein the plurality of LED chips are disposed on the copper circuit layer, and the soldering pins are welded to the soldering points;

a position limiting band, disposed on the copper circuit layer via another thermally conductive insulating layer, wherein the another thermally conductive insulating layer has a plurality of openings for exposing the soldering points of the copper circuit layer, and the position limiting band comprises: a plurality of position limiting holes, for receiving and fixing the LED chips; and a plurality of avoiding recesses, formed on the bottom of the inner wall of each position limiting hole pairwise;

a light guide plate, disposed in the housing, and a light-receiving surface of the light guide plate is opposite to the light-emitting surfaces of the LED chips; and a bottom reflector, disposed on the bottom of the light guide plate for preventing light leakage.

The fourth objective of the present invention is to provide an LED backlight module structure for increasing process yield, in which a position limiting band is disposed on the copper circuit layer for receiving and fixing the LED chips, moreover, the copper circuit layer and the position limiting band are disposed on the outer surface of the housing for meeting the demands from different structure design of LED backlight module Therefore, to achieve the fourth objective of the present invention, the inventor proposes an LED backlight module structure for increasing process yield, comprising:

a housing, having at least one circuit-disposing portion, and the circuit-disposing portion has a plurality of disposing holes;

a circuit substrate;

a copper circuit layer, disposed on the surface of the circuit substrate through a thermally conductive insulating layer, wherein the copper circuit layer has at least one main circuit and a plurality of soldering point;

a plurality of LED chips, having a plurality of soldering pins and a light-emitting surface on the bottoms and the tops thereof, wherein the plurality of LED chips are disposed on the copper circuit layer, and the soldering pins are welded to the soldering points; moreover, the circuit substrate is attached to the outer surface of the circuit-disposing portion via another thermally conductive insulating layer, such that the LED chips can respectively pass through the disposing holes and enter the interior of the housing from the outer surface of the circuit-disposing portion;

a position limiting band, disposed on the copper circuit layer via another thermally conductive insulating layer, wherein the another thermally conductive insulating layer has a plurality of openings for exposing the soldering points of the copper circuit layer, and the position limiting band comprising:

a plurality of position limiting holes, for receiving and fixing the LED chips; and a plurality of avoiding recesses, being formed on the bottom of the inner wall of each position limiting hole pairwise;

a light guide plate, disposed in the housing, and a light-receiving surface of the light guide plate is opposite to the light-emitting surfaces of the LED chips; and a bottom reflector, disposed on the bottom of the light guide plate for preventing light leakage.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe an LED backlight module structure for increasing process yield according to the present invention, embodiments of the present invention will be described in detail with reference to the attached drawings hereinafter.

Figure 1:
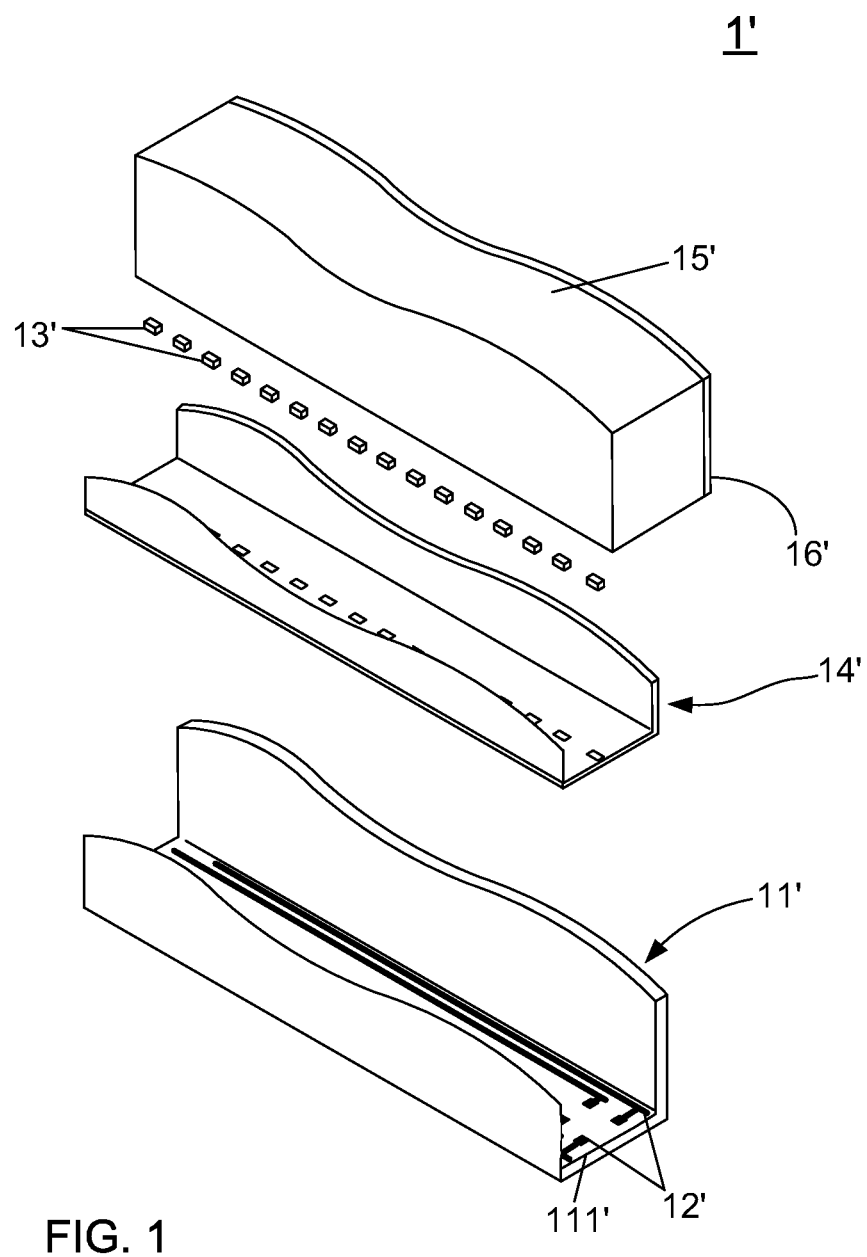
FIG. 1 is a stereo diagram of a conventional LED backlight module.
Figure 2:
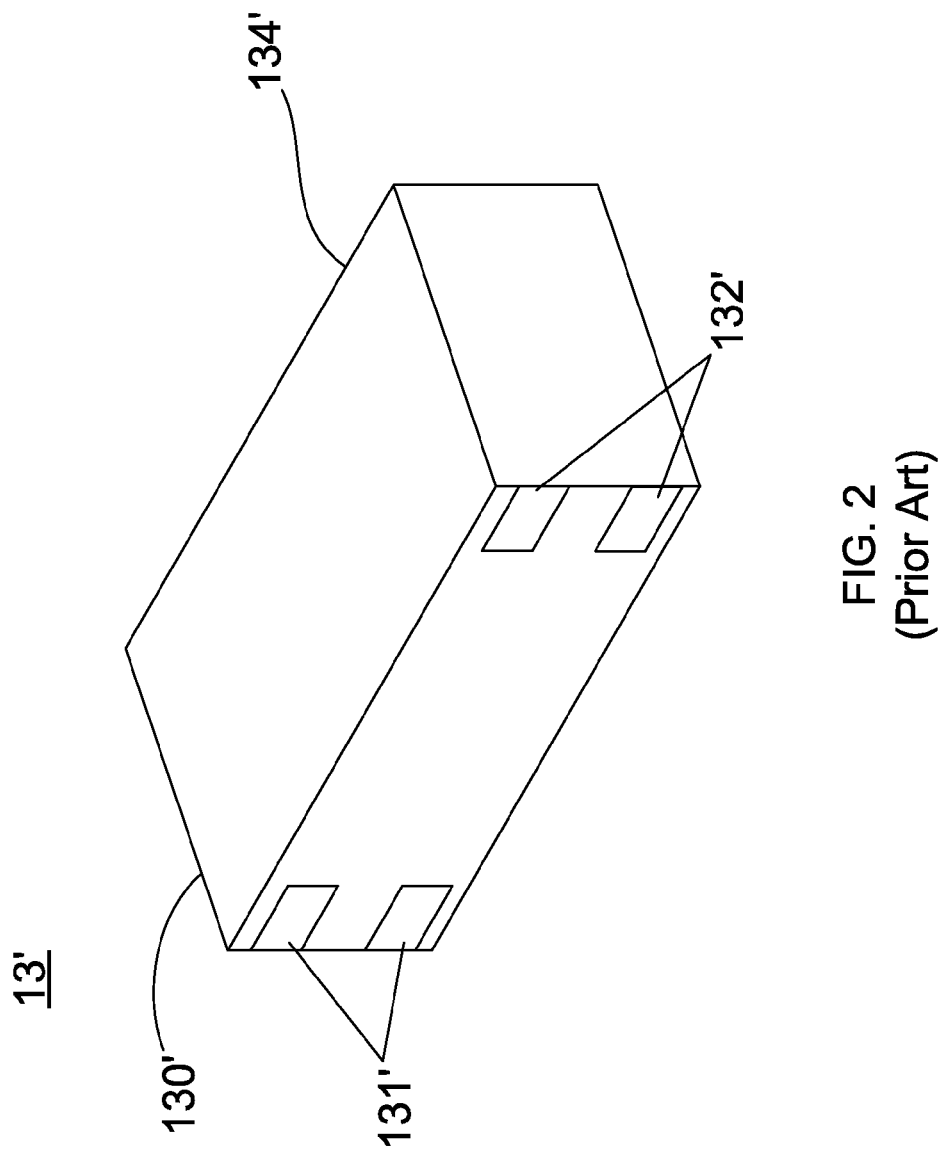
FIG. 2 is stereo diagram of an LED chip.
Figure 3A:
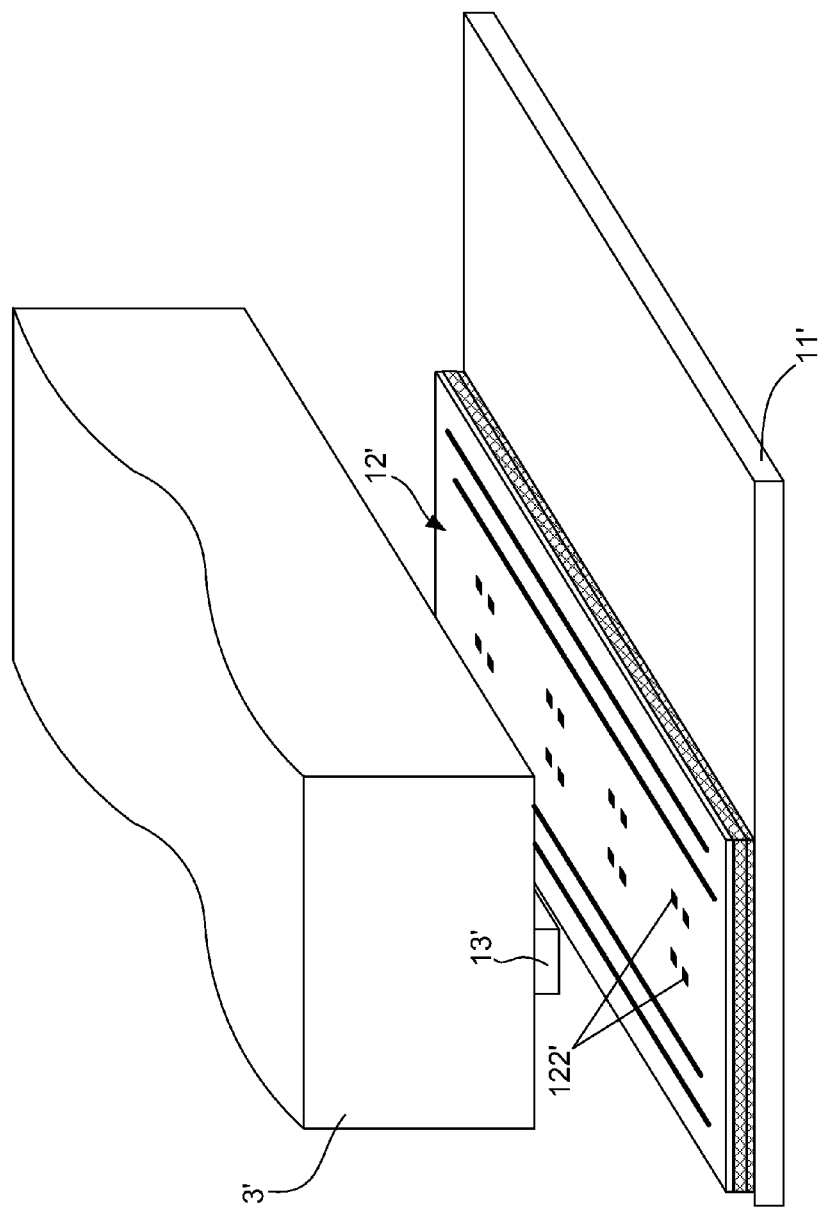
FIG. 3A to FIG. 3C are schematic welding processes diagram of the LED chips.
Figure 3B:
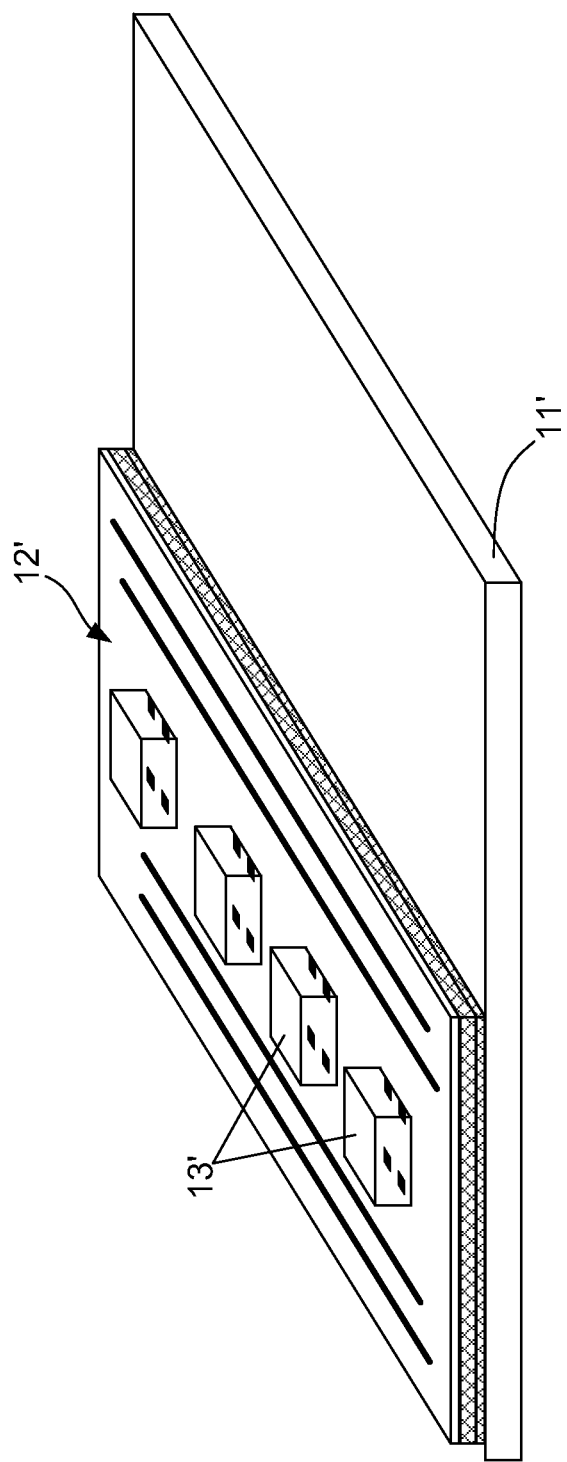
Figure 3C:
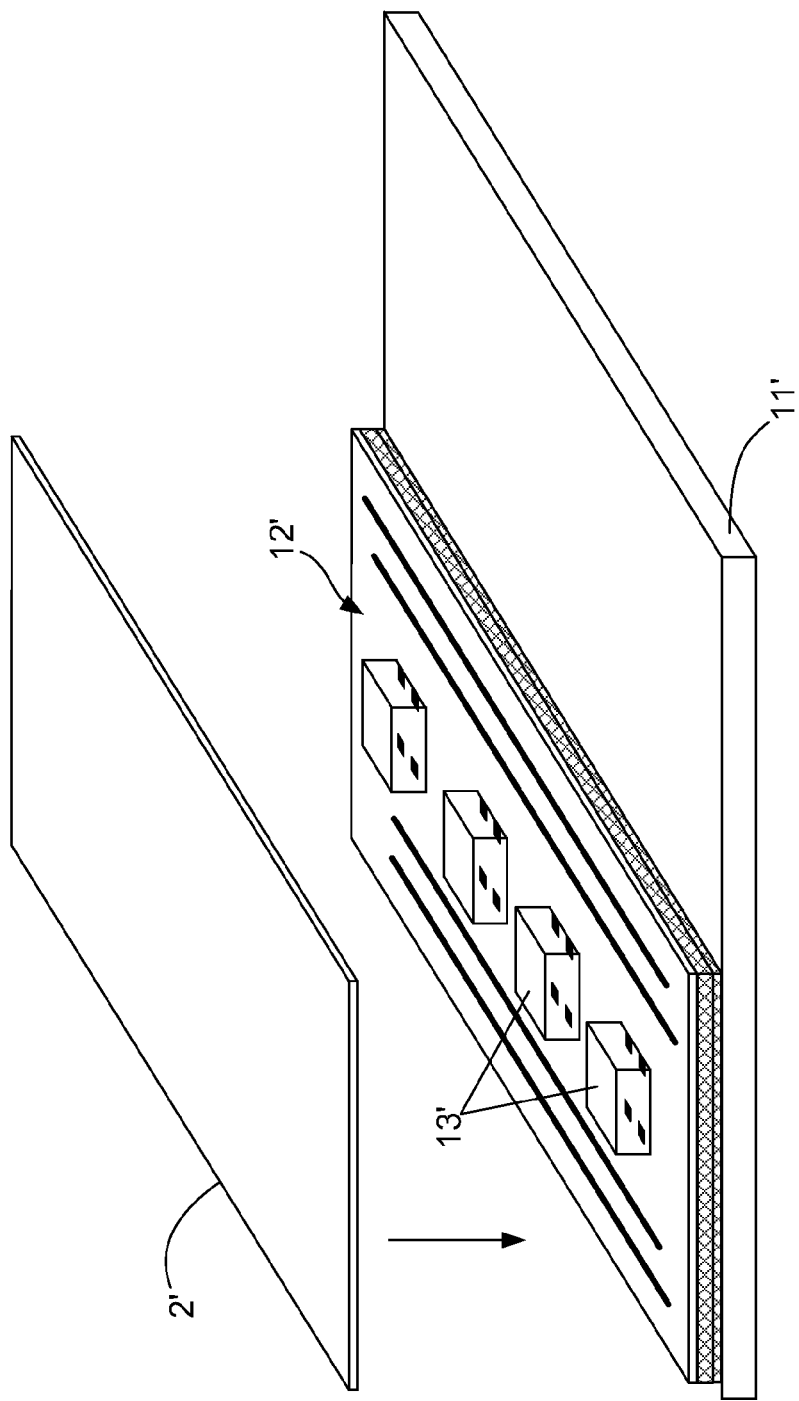
Figure 4:
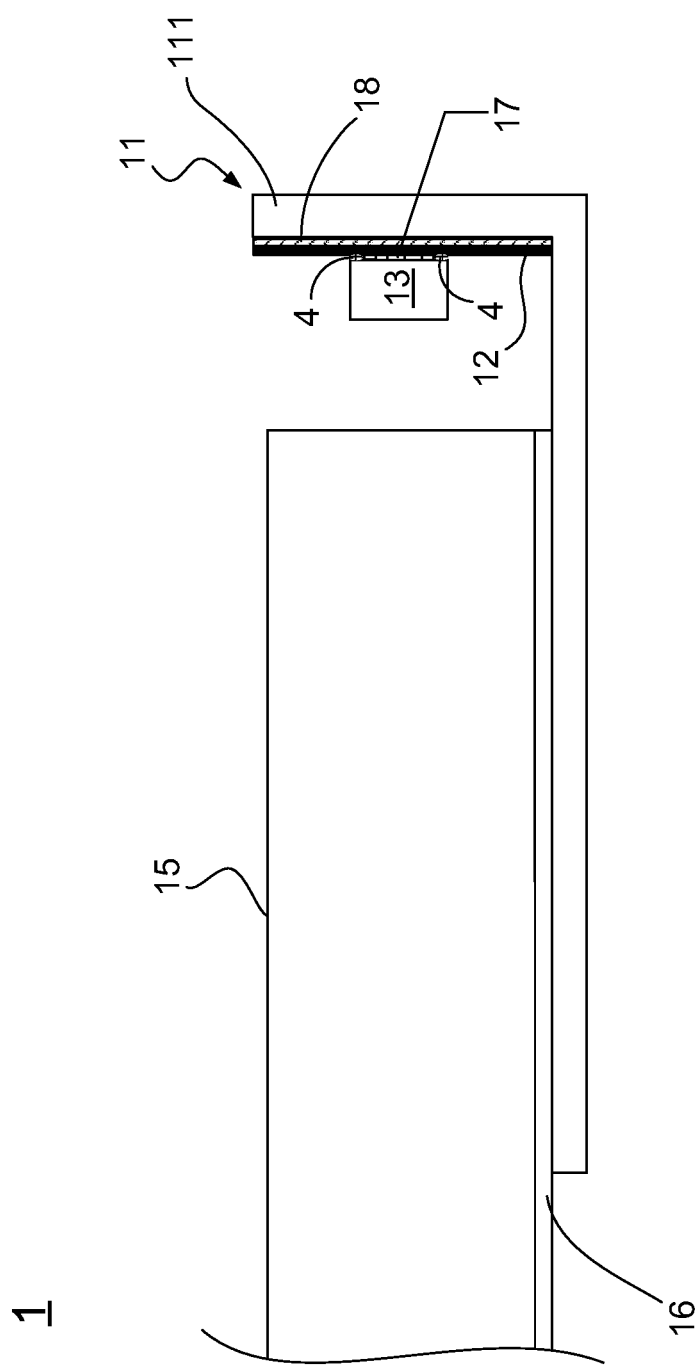
FIG. 4 is a side view of a first embodiment of an LED backlight module structure for increasing process yield according to the present invention.
Figure 5:
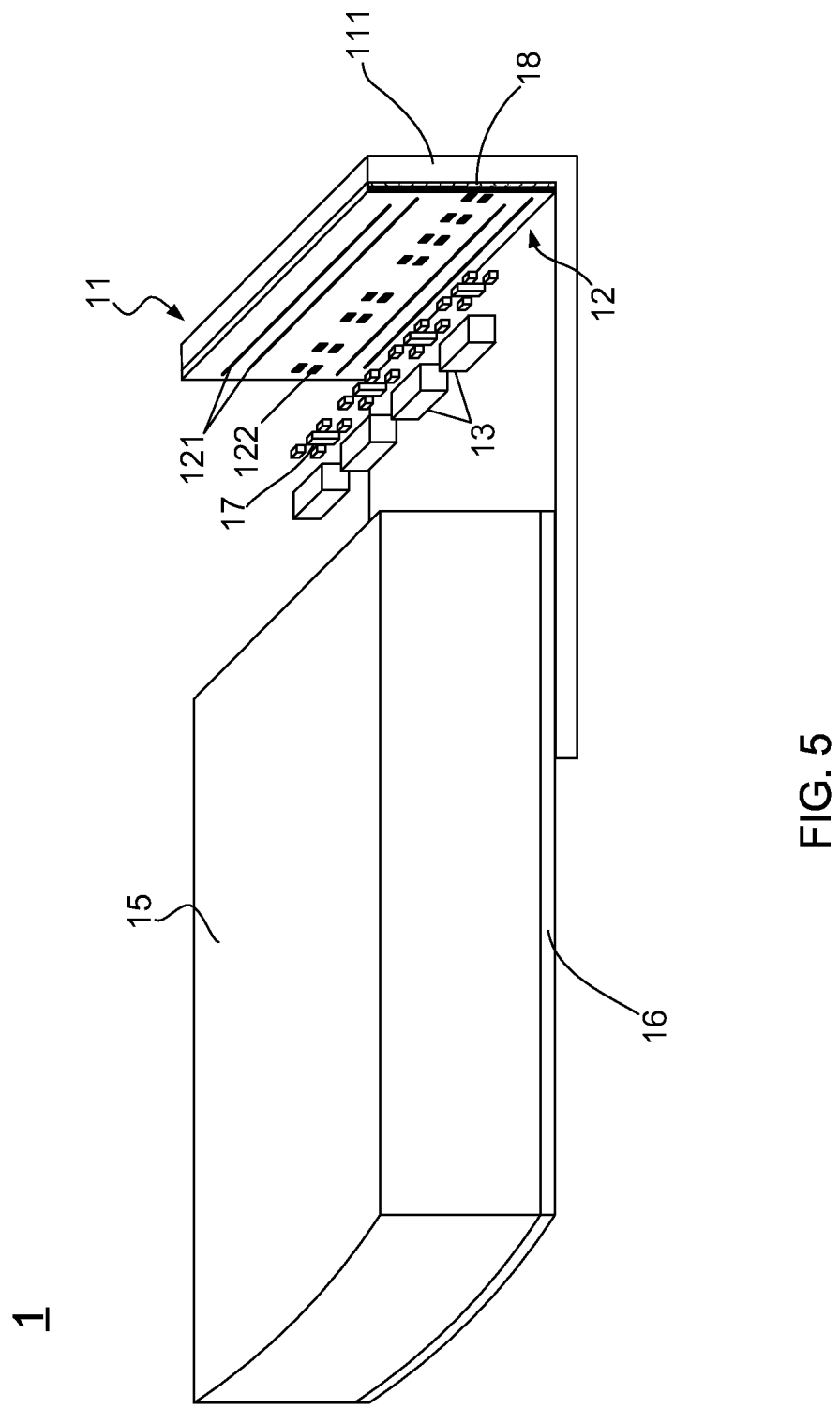
FIG. 5 is a stereo exploded view of the first embodiment of the LED backlight module structure for increasing process yield according to the present invention.

The LED backlight module structure for increasing process yield provided in the present invention includes many embodiments, please refer to FIG. 4 and FIG. 5, there are shown a side view and a stereo exploded view of a first embodiment of an LED backlight module structure for increasing process yield according to the present invention. As shown in FIG. 4 and FIG. 5, the first embodiment of the LED backlight module 1 for increasing process yield includes: a housing 11, a copper circuit layer 12, a plurality of LED chips 13, a plurality of solder paste overflow prevention members 17, a light guide plate 15, and a bottom reflector 16.

Figure 6:
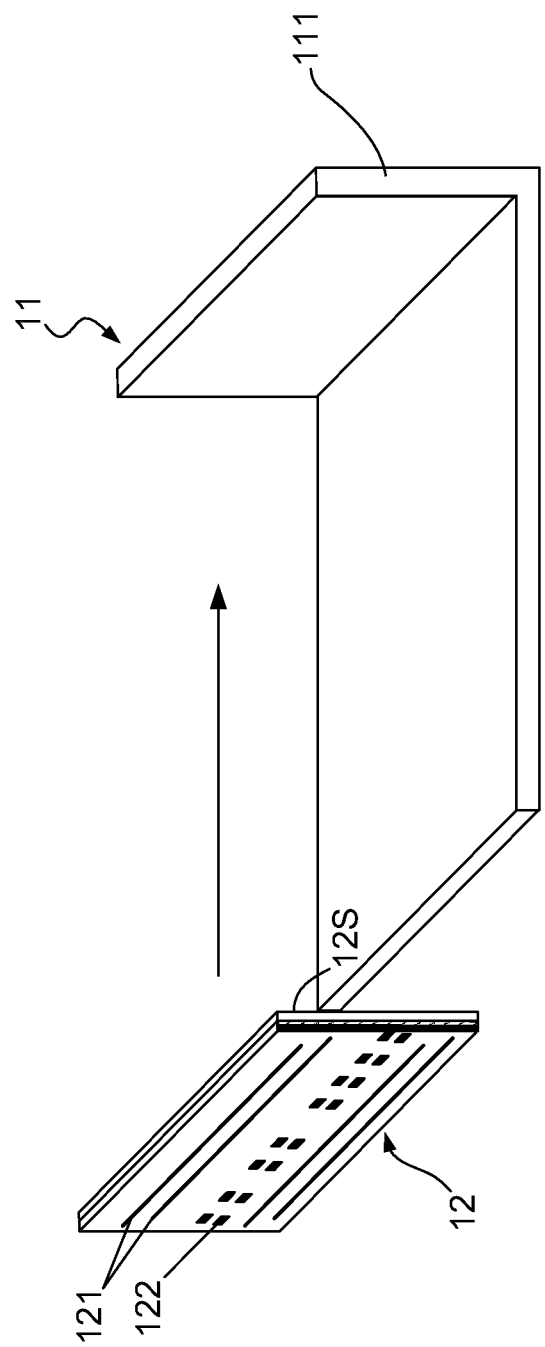
FIG. 6 is a stereo diagram of a copper circuit layer, a circuit substrate and a housing of the LED backlight module structure for increasing process yield.

Continuously referring to FIG. 5, and please simultaneously refer to FIG. 6, which illustrates a stereo diagram of a copper circuit layer, a circuit substrate and a housing of the LED backlight module structure for increasing process yield. As shown in FIG. 5, in the present invention, the copper circuit layer 12 is disposed on the surface of a circuit-disposing portion 111 of the housing 11 through a thermally conductive insulating layer 18, and the copper circuit layer 12 has at least one main circuit 121 and a plurality of soldering point 122. However, as shown in FIG. 6, the copper circuit layer 12 can also be disposed on a circuit substrate 12S, and then the circuit substrate 12S is disposed on the surface of the circuit-disposing portion 111 through the thermally conductive insulating layer 18. In which, the material of the circuit substrate 12S may be aluminum or fiberglass.

Referring to FIG. 4 and FIG. 5 again, each LED chip 13 has a plurality of soldering pins and a light-emitting surface on the bottom and the top thereof. In the present invention, the plurality of LED chips 13 are disposed on the copper circuit layer 12 and the soldering pins of the LED chips 13 are welded to the soldering points 122 of the copper circuit layer 12. The plurality of solder paste overflow prevention members 17 are disposed between the LED chips 13 and the copper circuit layer 12, wherein each solder paste overflow prevention member 17 consists of a bar-shaped solder paste overflow prevention member and a block-shaped solder paste overflow prevention member, and the material of the solder paste overflow prevention member 17 can be heat-resistant adhesive tape, acrylic, silicone, and epoxy resin.

Figure 7:
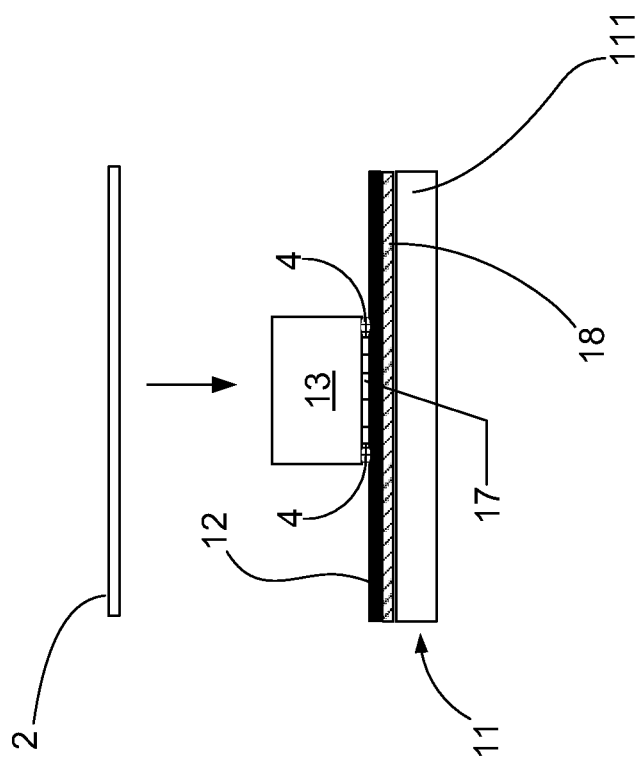
FIG. 7 is a side view of the housing, the copper circuit layer, a thermally conductive insulating layer, and a solder paste overflow prevention member of the LED backlight module structure for increasing process yield.

Continuously referring to FIG. 5, and please refer to FIG. 7, which illustrates a side view of the housing, the copper circuit layer, the thermally conductive insulating layer, and the solder paste overflow prevention member of the LED backlight module structure for increasing process yield. As shown in FIG. 7, in the present invention, it mainly respectively disposed the solder paste overflow prevention members 17 between the LED chips 13 and the copper circuit layer 12, therefore, the solder paste overflow phenomenon can be prevented when using a pressing fixture 2 to assist in executing the welding process of the LED chips 13, and then it can make sure that the soldering pins of the LED chips 13 would not electrically connect to each other due to the solder paste overflow phenomenon.

The structure of aforesaid first embodiment is the simplest structure of the LED backlight module structure 1 for increasing process yield; However, for meeting the demands from different structure design of LED backlight module, it can also add some constituting elements or members into the simplest structure of the LED backlight module structure, such that the LED backlight module structure may performs more functionality.

Figure 8:
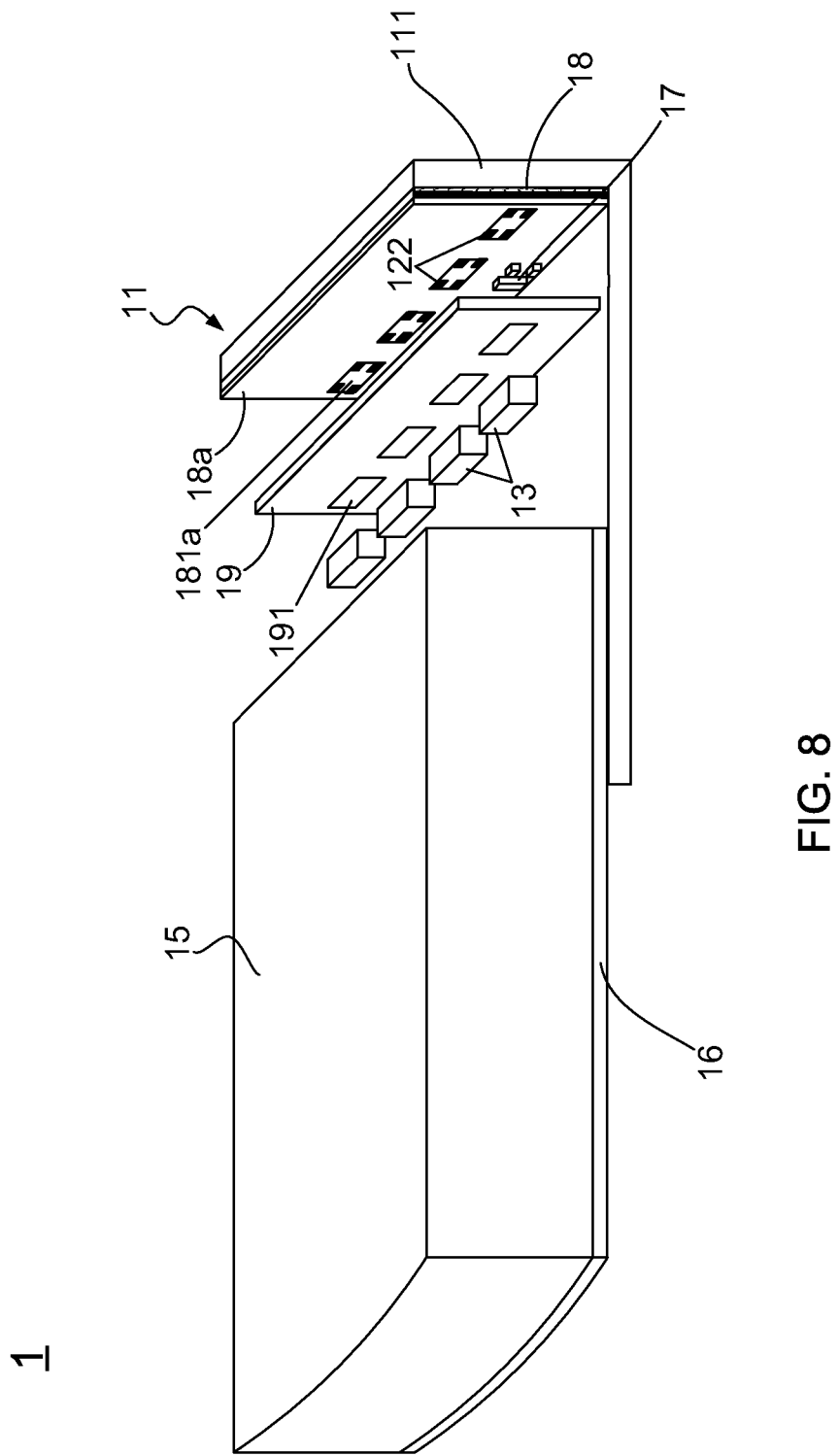
FIG. 8 is a stereo exploded view of a second embodiment of the LED backlight module structure for increasing process yield according to the present invention.
Figure 9:
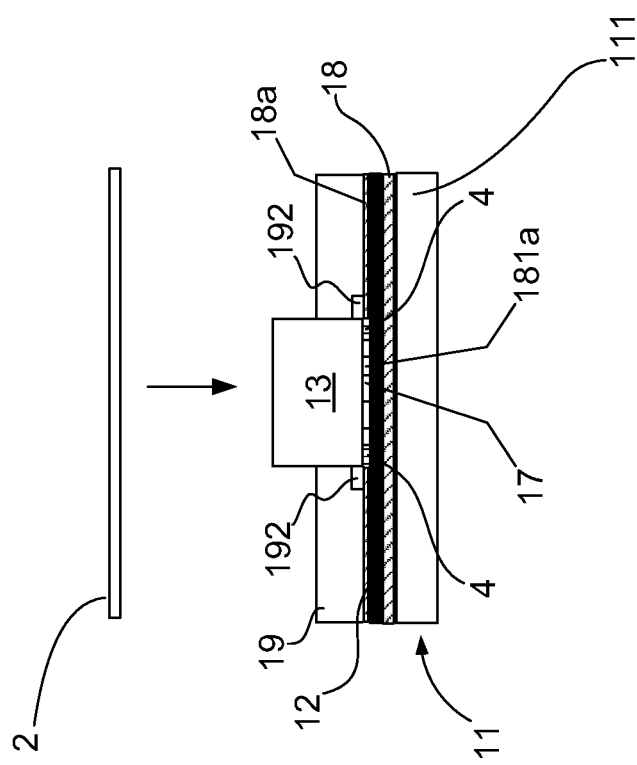
FIG. 9 is a side view of the housing, the copper circuit layer, the thermally conductive insulating layer, and a position limiting band of the LED backlight module structure for increasing process yield.

Please refer to FIG. 8, there is shown a stereo exploded view of a second embodiment of the LED backlight module structure for increasing process yield according to the present invention; in addition, please simultaneously refer to FIG. 9, which illustrates a side view of the housing, the copper circuit layer, the thermally conductive insulating layer, and a position limiting band of the LED backlight module structure for increasing process yield. As shown in FIG. 8, the second embodiment of the LED backlight module structure for increasing process yield is completed after a position limiting band 19 is added into the structure of aforesaid first embodiment. As shown in FIG. 9, in the second embodiment, the position limiting band 19 is disposed on the copper circuit layer 12 through a thermally conductive insulating layer 18a, and the thermally conductive insulating layer 18a includes a plurality of openings 181a for exposing the soldering points 122 of the copper circuit layer 12.

Continuously refer to FIG. 8 and FIG. 9, in the second embodiment, the position limiting band 19 consists of a plurality of position limiting holes 19 and a plurality of avoiding recesses 192, wherein the position limiting holes 191 is used for receiving and fixing the LED chips 13, and the avoiding recesses 192 are formed on the bottom of the inner wall of each position limiting hole 191 pairwise. Thus, when using the pressing fixture 2 to assist in executing the welding process of LED chips 13, it is able to avoid the solder paste overflow cause by the pressing fixture 2 from attaching to the position limiting band 19 and extendedly getting into the position limiting holes 191 of the position limiting band 19. Moreover, in the second embodiment, each LED chip 13 is limited and fixed in the position limiting hole 191, and LED chip 13 clings to the inner walls of the position limiting hole 191. So that, because the materials of the position limiting band 19 and the housing 11 are metal, the position limiting band 19 is helpful to the LED chips 13 in heat dissipation when the LED chips 13 emit light.

Figure 10:
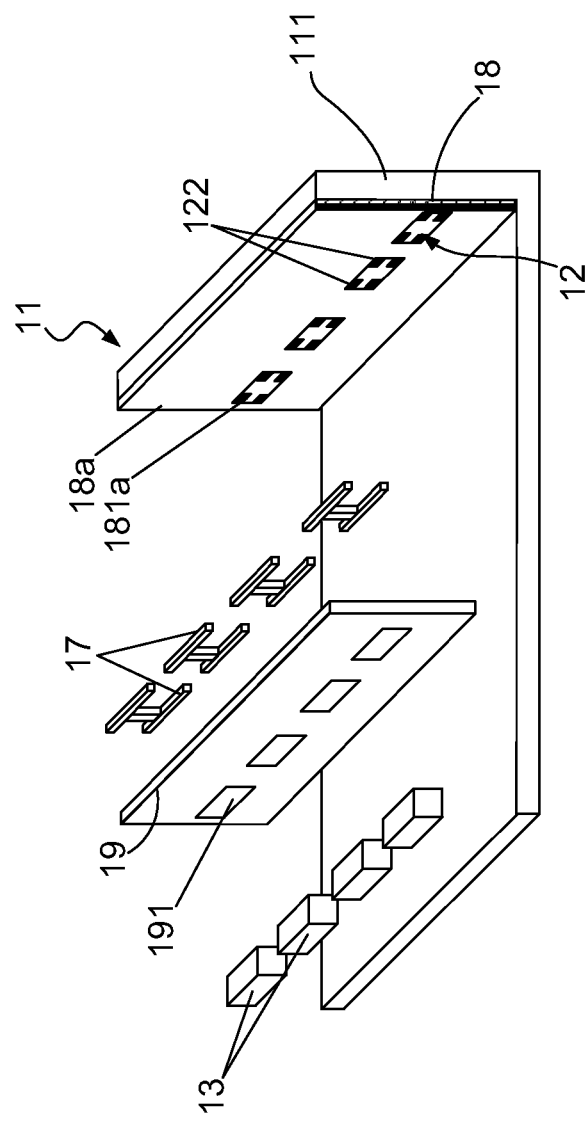
FIG. 10 is a stereo diagram of the housing, the copper circuit layer, the thermally conductive insulating layer, and the position limiting band of the LED backlight module structure for increasing process yield.

Referring to FIG. 8 again, and please refer to FIG. 10, there is shown a stereo diagram of the housing, the copper circuit layer, the thermally conductive insulating layer, and the position limiting band of the LED backlight module structure for increasing process yield. As shown in FIG. 10, for the second embodiment of the LED backlight module structure 1, the one bar-shaped solder paste overflow prevention member and the four block-shaped solder paste overflow prevention members may be integratedly formed to one H-shaped solder paste overflow prevention member.

Furthermore, for the aforesaid first embodiment of the LED backlight module structure 1, it is able to increase the backlight efficiency thereof by being added a reflector. Please refer to FIG. 11, which illustrates a stereo diagram of the first embodiment of the LED backlight module structure for increasing process yield having a reflector. As shown in FIG.

11, the reflector 14 is added into the aforesaid first embodiment of the LED backlight module structure 1, wherein the reflector 14 is disposed on the surface of the copper circuit layer 12 and has a plurality of LED through holes (not shown in FIG. 11) for pass of the LED chips 13. Moreover, please refer to FIG. 12, there is shown a stereo diagram of the second embodiment of the LED backlight module structure for increasing process yield having the reflector. As shown in FIG. 12, the reflector 14 can also be added into the second embodiment of the LED backlight module structure 1, in which, the reflector 14 is disposed on the position limiting band 19 and has a plurality of LED through holes 141 for pass of the LED chips 13.

Figure 13A:
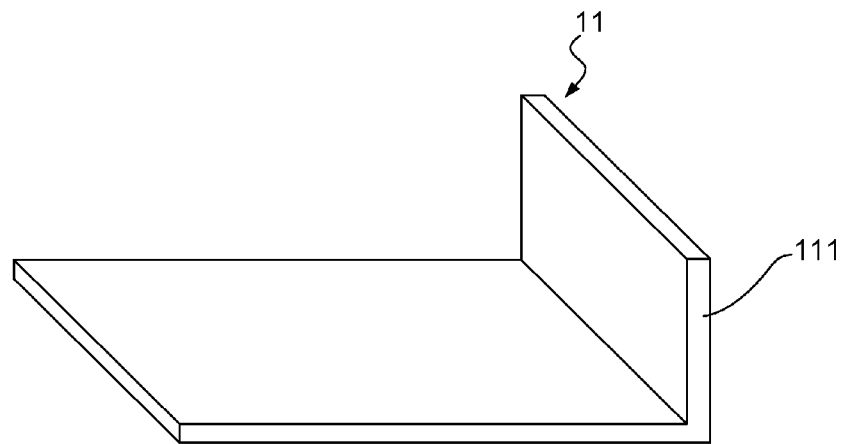
FIG. 13A and FIG. 13B are stereo diagrams of a L-shaped housing and a ⊓-shaped housing.
Figure 13B:
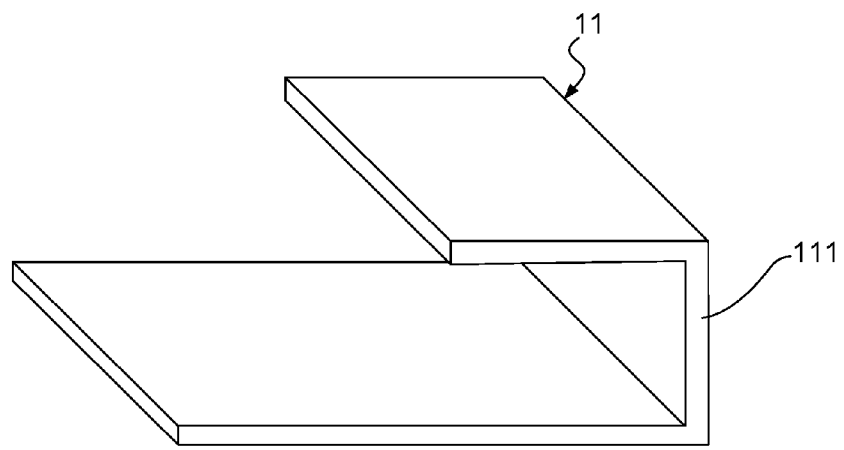
Figure 14:
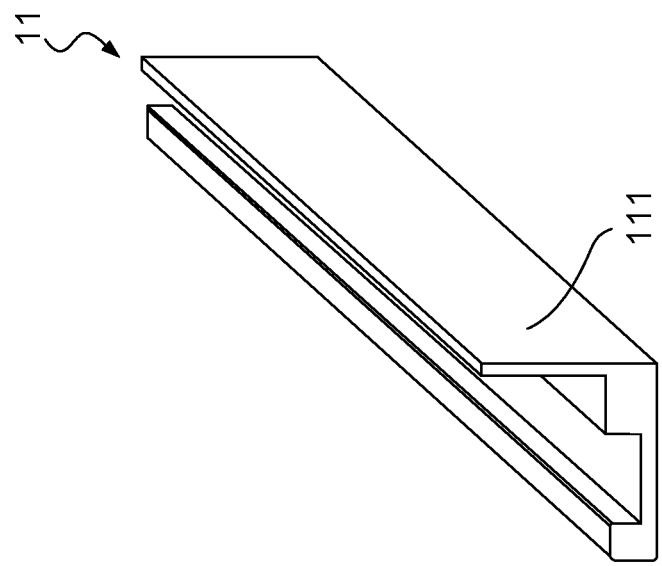
FIG. 14 is a stereo diagram of an extrusion housing.

Please refer to FIG. 13A and FIG. 13B, there are shown stereo diagrams of a L-shaped housing and a ⊓-shaped housing. For the aforesaid first embodiment and second embodiment of the LED backlight module structure 1, the housing 11 can be a sheet metal housing; as shown in FIG. 13A and FIG. 13B, the sheet metal housing may be formed to a L-shaped housing or a ⊓-shaped housing. Besides, please refer to FIG. 14, which illustrates a stereo diagram of an extrusion housing. Of course, it is not limited the housing 11 to the sheet metal housing; As shown in FIG. 14, in the present invention, the housing 11 can also be an extrusion housing.

Figure 15:
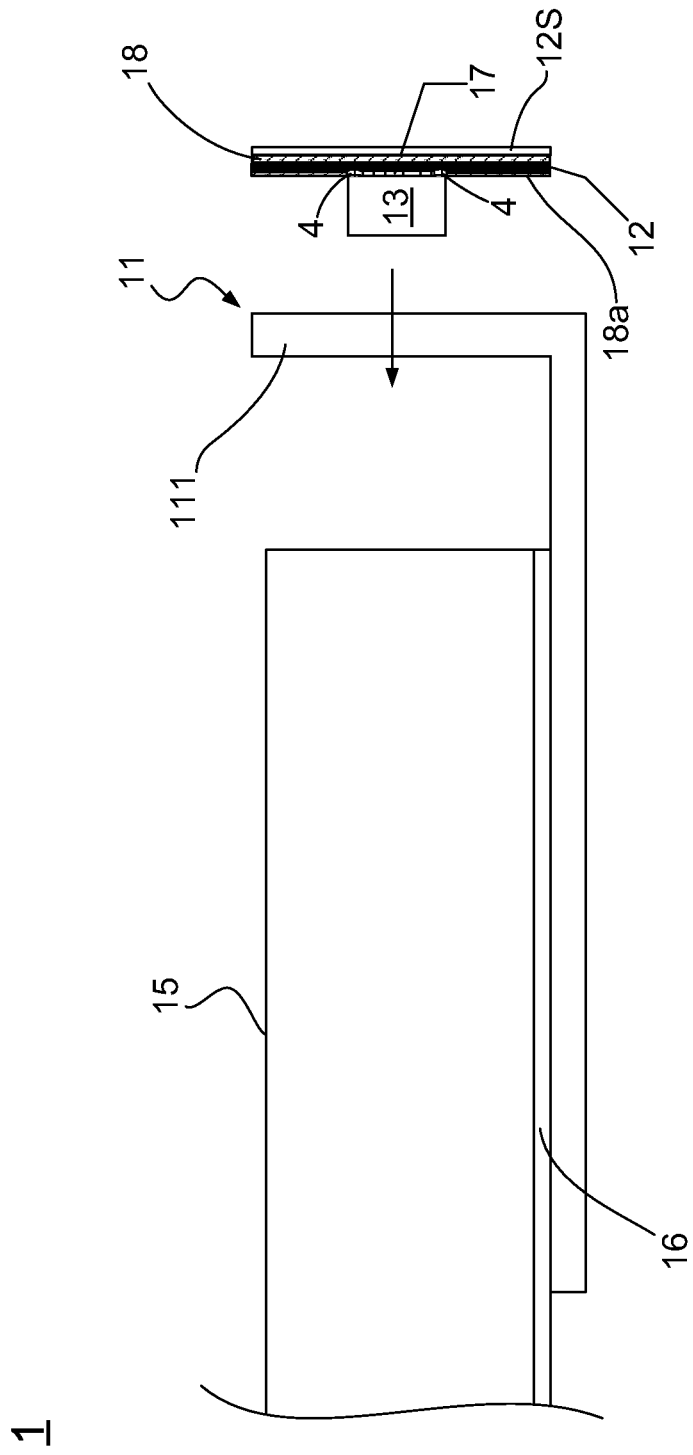
FIG. 15 is a side view of a third embodiment of an LED backlight module structure for increasing process yield according to the present invention.
Figure 16:
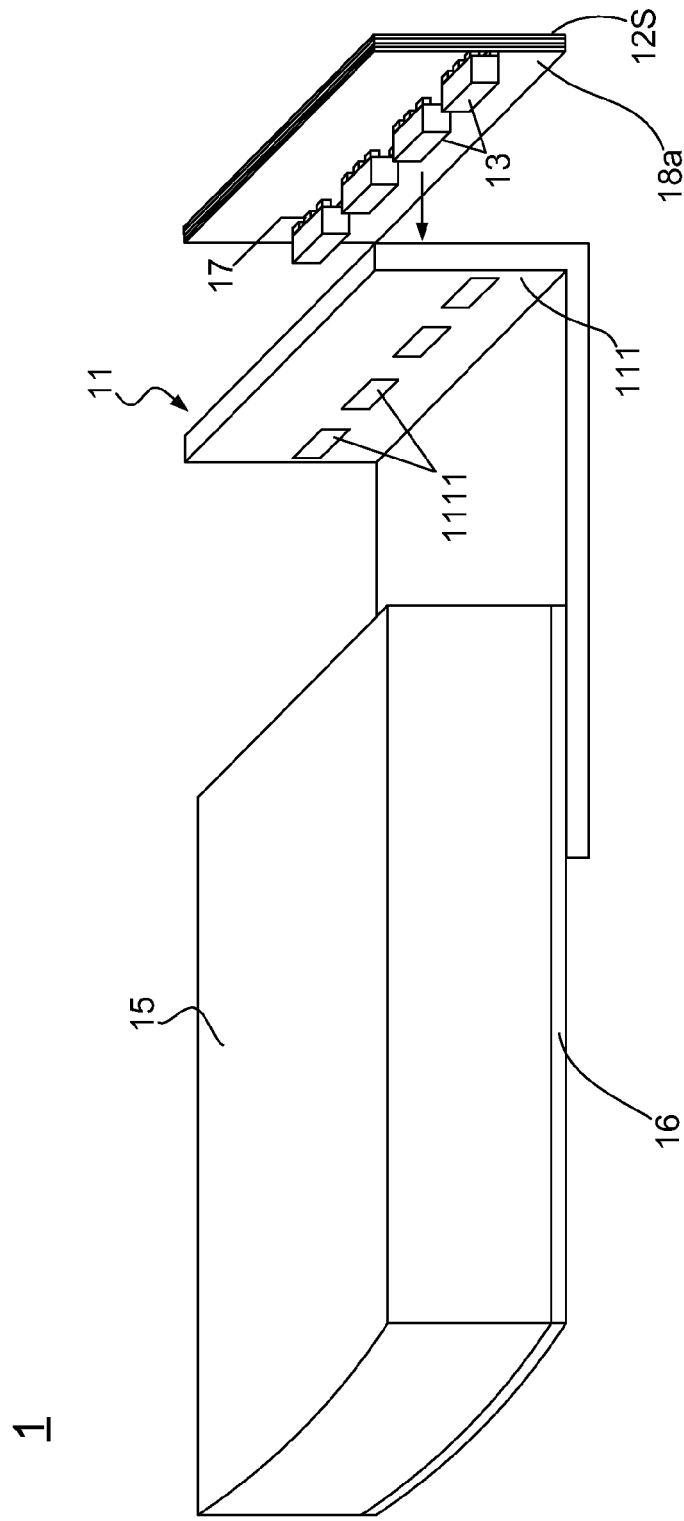
FIG. 16 is a stereo exploded view of the third embodiment of the LED backlight module structure for increasing process yield according to the present invention.

The present invention further provides a third embodiment of the LED backlight module structure 1. Please refer to FIG. 15 and FIG. 16, there are shown a side view and a stereo exploded view of the third embodiment of the LED backlight module structure for increasing process yield according to the present invention. As shown in FIG. 15 and FIG. 16, the third embodiment of the LED backlight module structure 1 includes: a housing 11, a circuit substrate 12S, a copper circuit layer 12, a plurality of LED chips 13, a plurality of solder paste overflow prevention members 17, a light guide plate 15, and a bottom reflector 16. In which, the aforesaid constituting elements of the third embodiment are all the same to the constituting elements of the first embodiment; However, differing from the first embodiment, the circuit substrate 12S, the copper circuit layer 12, the plurality of LED chips 13, and the plurality of solder paste overflow prevention members 17 are disposed in the exterior of the housing 11.

In the third embodiment, the housing 11 includes a circuit-disposing portion 111, and the circuit-disposing portion 111 having a plurality of disposing holes 111. The copper circuit layer 12 is disposed on the surface of the circuit substrate 12S through a thermally conductive insulating layer 18, wherein the copper circuit layer 12 has at least one main circuit 121 and a plurality of soldering point 122 (the main circuit 121 and the soldering points 122 are not shown in FIG. 15 and FIG. 16). The LED chips 13 are disposed on the copper circuit layer 12, and each LED chips 13 has a plurality of soldering pins and a light-emitting surface on the bottom and the top thereof, wherein the LED chips 13 are welded to the soldering points 122 by a solder 4. The circuit substrate 12S is attached to the outer surface of the circuit-disposing portion 111 via another thermally conductive insulating layer 18a, such that the LED chips 13 can respectively pass through the disposing holes 1111 and enter the interior of the housing 11 from the outer surface of the circuit-disposing portion 111.

For aforesaid third embodiment, it is not limited to use the disposed the copper circuit layer 12 on the surface of the circuit substrate 12S. In the third embodiment, it can also directly attached the copper circuit layer 12 to the outer surface of the circuit-disposing portion 111 through the thermally conductive insulating layer 18, such that the LED chips 13 also respectively pass through the disposing holes 1111 and enter the interior of the housing 11 from the outer surface of the circuit-disposing portion 111. Thus, by this way, it can also finish the third embodiment of the LED backlight module structure without using the circuit substrate 12S and the another thermally conductive insulating layer 18a.

In addition, in the third embodiment, the plurality of solder paste overflow prevention members 17 are disposed between the LED chips 13 and the copper circuit layer 12, wherein each solder paste overflow prevention member 17 consists of a bar-shaped solder paste overflow prevention member and a block-shaped solder paste overflow prevention member, and the material of the solder paste overflow prevention member 17 can be heat-resistant adhesive tape, acrylic, silicone, and epoxy resin.

Figure 17:
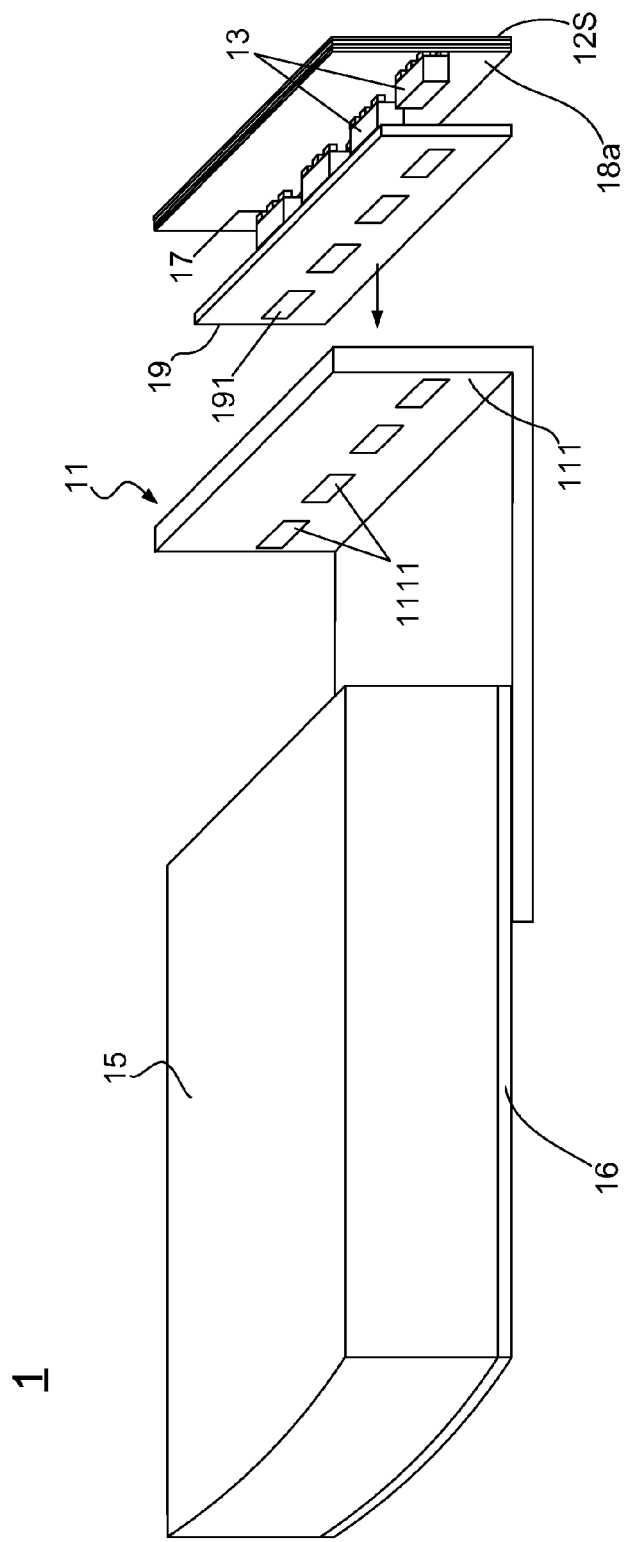
FIG. 17 is a stereo exploded view of a fourth embodiment of the LED backlight module structure for increasing process yield according to the present invention.

Similarly, for meeting the demands from different structure design of LED backlight module, it can also add some constituting elements or members into the third embodiment of the LED backlight module structure 1, such that the LED backlight module structure may performs more functionality. Please refer to FIG. 17, there is shown a stereo exploded view of a fourth embodiment of the LED backlight module structure for increasing process yield according to the present invention. As shown in FIG. 17, the fourth embodiment of the LED backlight module structure for increasing process yield is completed after a position limiting band 19 is added into the structure of aforesaid third embodiment. In the fourth embodiment, the position limiting band 19 is disposed on the copper circuit layer 12 through a thermally conductive insulating layer 18a, and the thermally conductive insulating layer 18a includes a plurality of openings 181a (FIG. 17 does not shown the openings 181a) for exposing the soldering points 122 of the copper circuit layer 12.

Figure 18:
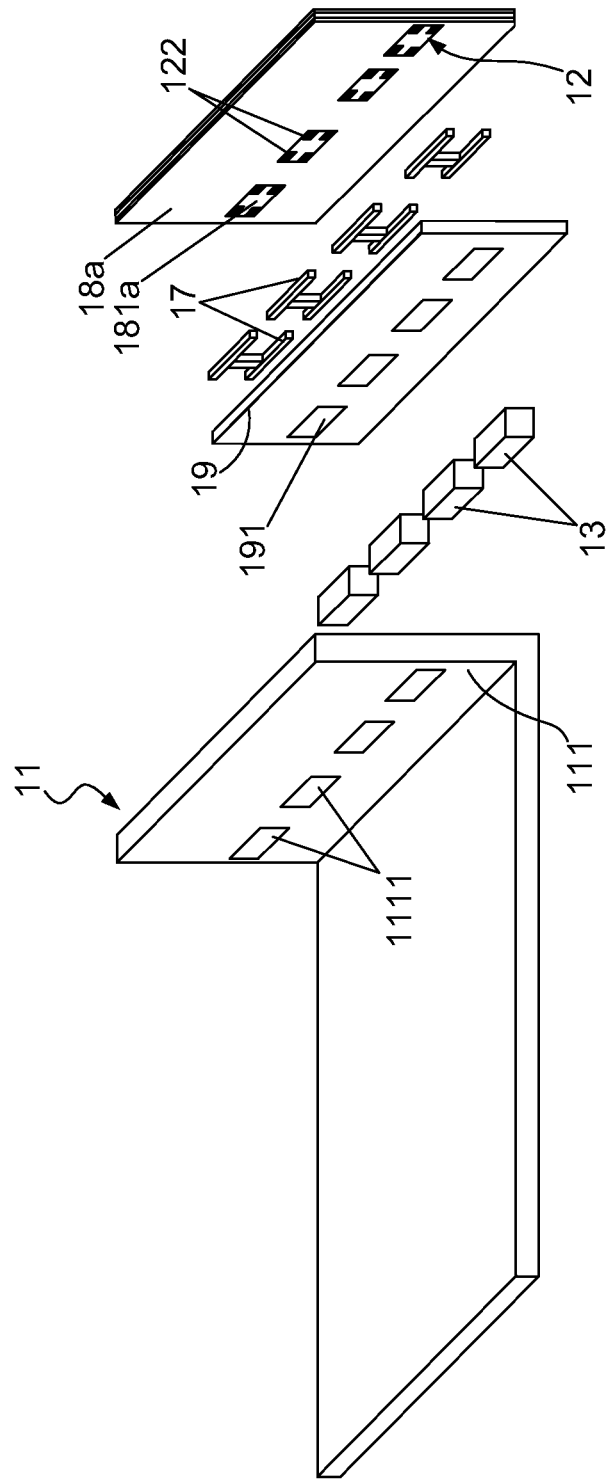
FIG. 18 is a stereo diagram of the housing, the copper circuit layer, the thermally conductive insulating layer, the position limiting band, the solder paste overflow prevention member, and the circuit substrate of the LED backlight module structure for increasing process yield.

Referring to FIG. 17 again, and please simultaneously refer to FIG. 18, which illustrates a stereo diagram of the housing, the copper circuit layer, the thermally conductive insulating layer, the position limiting band, the solder paste overflow prevention member, and the circuit substrate of the LED backlight module structure for increasing process yield. As shown in FIG. 18, for the fourth embodiment of the LED backlight module structure 1, the one bar-shaped solder paste overflow prevention member and the four block-shaped solder paste overflow prevention members may be integratedly formed to one H-shaped solder paste overflow prevention member.

Figure 11:
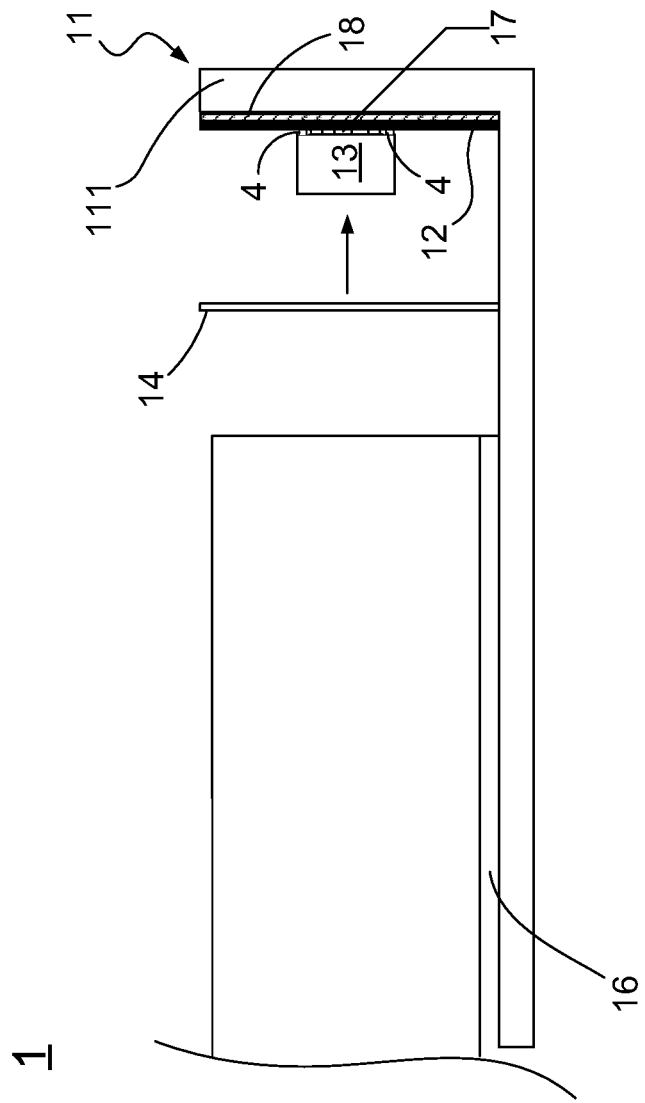
FIG. 11 is a stereo diagram of the first embodiment of the LED backlight module structure for increasing process yield having a reflector.
Figure 12:
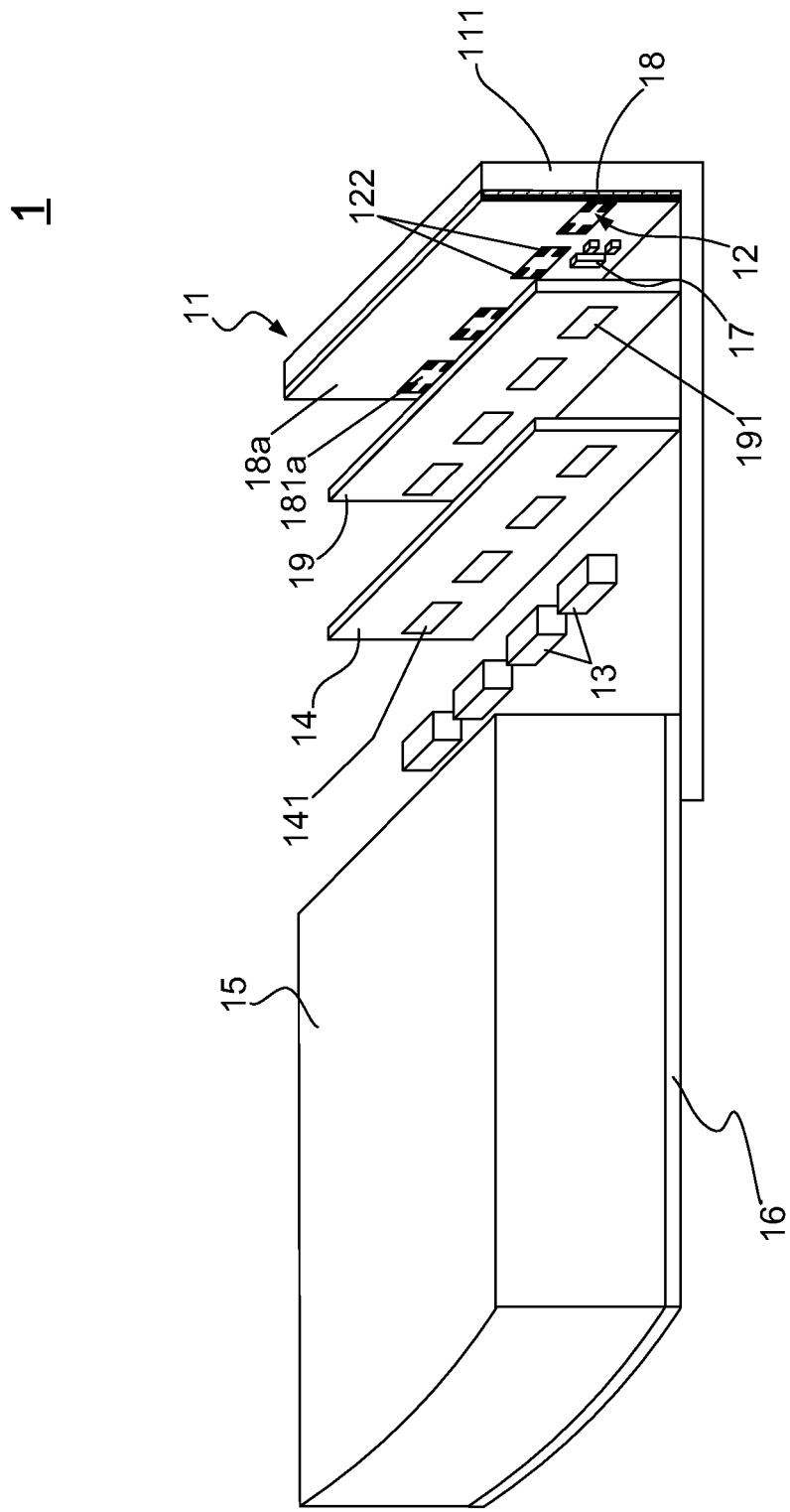
FIG. 12 is a stereo diagram of the second embodiment of the LED backlight module structure for increasing process yield having the reflector.

Furthermore, similarly, for the aforesaid third embodiment and fourth embodiment of the LED backlight module structure 1, it is able to increase the backlight efficiency thereof by being added a reflector 14, wherein the diagram and structure are according to FIG. 11 and FIG. 12. Besides, the same to the first embodiment and the second embodiment, the housing 11 used in the third embodiment and fourth embodiment of the LED backlight module structure 1 can not only be a sheet metal housing formed to a L-shaped housing or a ⊓-shaped housing, but also be an extrusion housing.

Figure 19:
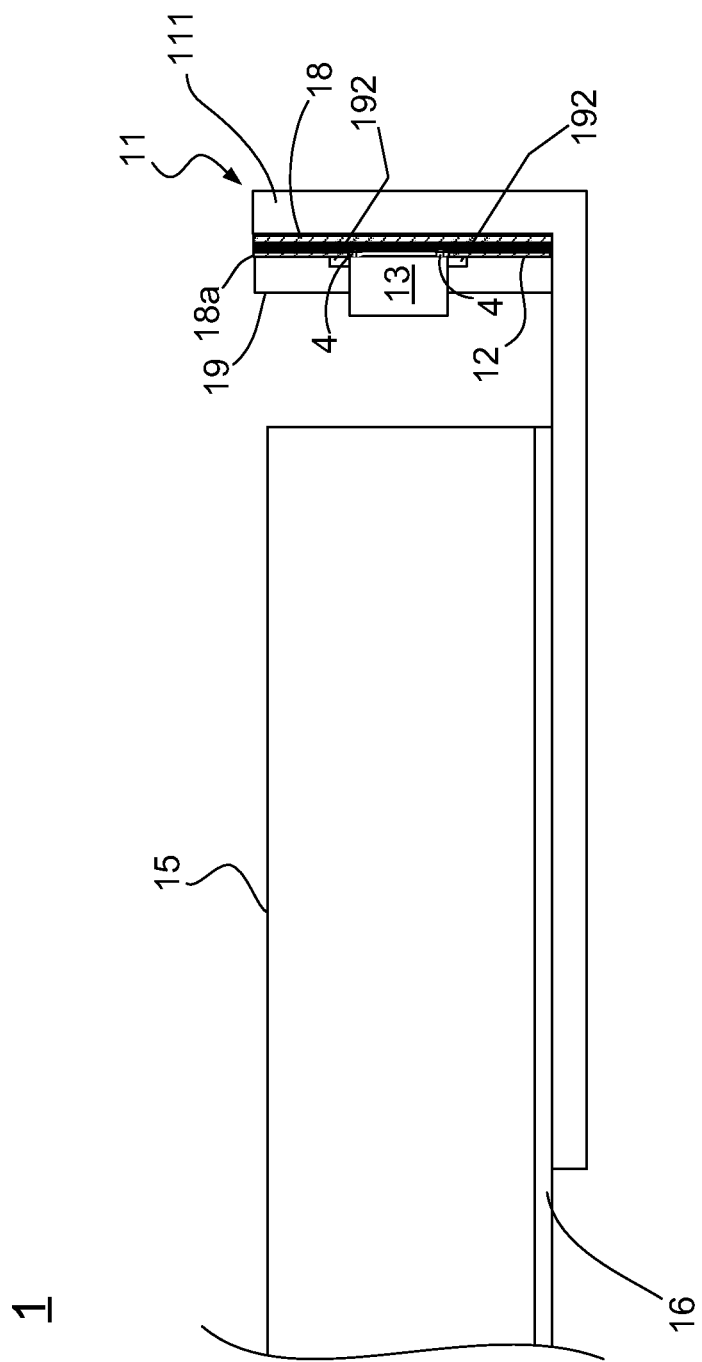
FIG. 19 is a side view of a fifth embodiment of an LED backlight module structure for increasing process yield according to the present invention.
Figure 20:
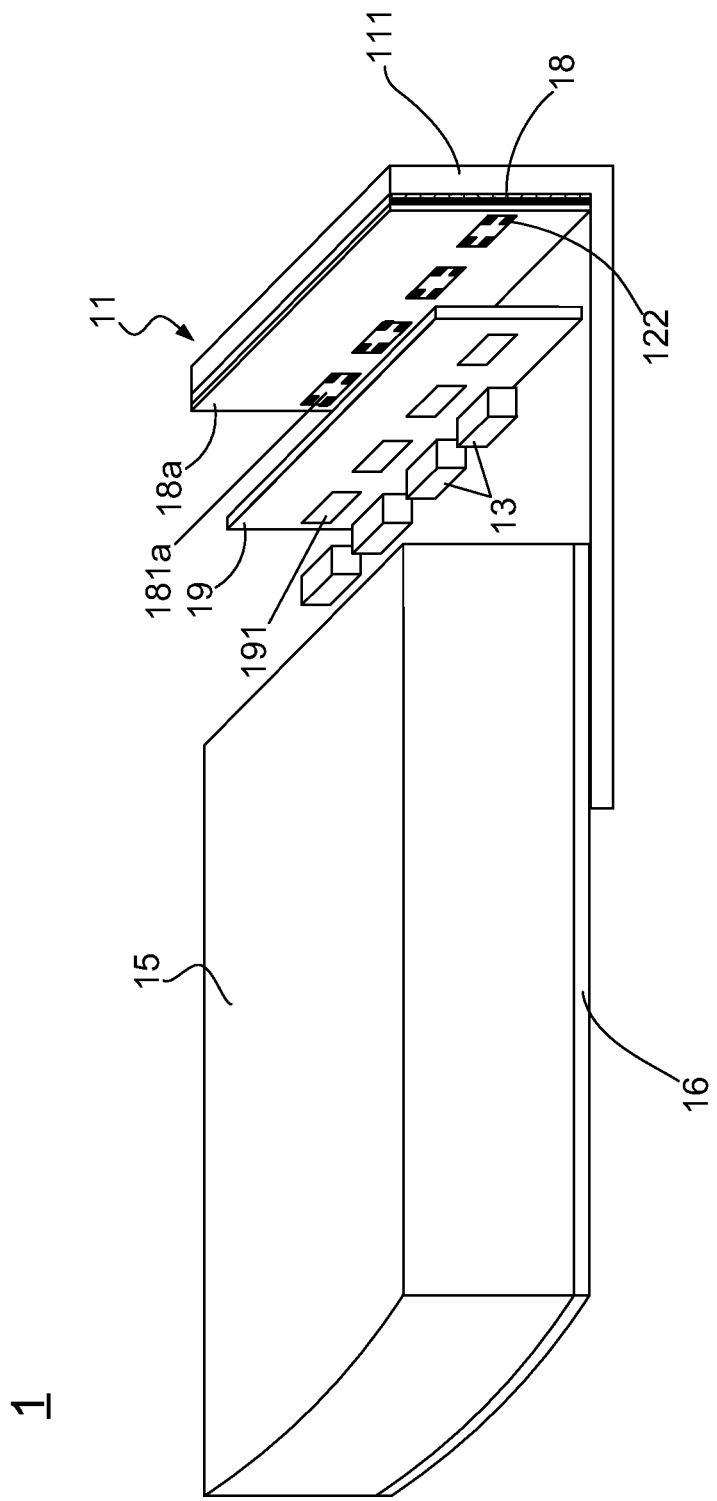
FIG. 20 is a stereo exploded view of the fifth embodiment of the LED backlight module structure for increasing process yield according to the present invention.

The present invention further provides a fifth embodiment of the LED backlight module structure 1. Please refer to FIG. 19 and FIG. 20, there are shown a side view and a stereo exploded view of the fifth embodiment of the LED backlight module structure for increasing process yield according to the present invention. As shown in FIG. 19 and FIG. 20, the fifth embodiment of the LED backlight module structure 1 includes: a housing 11, a copper circuit layer 12, a plurality of LED chips 13, a position limiting band 19, a light guide plate 15, and a bottom reflector 16, wherein the copper circuit layer 12 is disposed on the surface of a circuit-disposing portion 111 of the housing 11 through a thermally conductive insulating layer 18, wherein the copper circuit layer 12 has at least one main circuit 121 and a plurality of soldering point 122

(the main circuit 121 and the soldering points 122 are not shown in FIG. 19 and FIG. 20). Herein, the same to aforesaid first embodiment, for the fifth embodiment, the copper circuit layer 12 can also be disposed on a circuit substrate 12S, and then the circuit substrate 12S is disposed on the surface of the circuit-disposing portion 111 through the thermally conductive insulating layer 18.

The plurality of LED chips 13 are disposed on the copper circuit layer 12, and each LED chips 13 has a plurality of soldering pins and a light-emitting surface on the bottom and the top thereof, wherein the plurality of LED chips 13 are welded to the soldering points 122 by a solder 4. The position limiting band 19 is disposed on the copper circuit layer 12 via another thermally conductive insulating layer 18a, wherein the another thermally conductive insulating layer 18a has a plurality of openings 181a for exposing the soldering points 122 of the copper circuit layer 12. The position limiting band 19 includes: a plurality of position limiting holes 191, for receiving and fixing the LED chips 13, and a plurality of avoiding recesses 192, formed on the bottom of the inner wall of each position limiting hole 191 pairwise. In addition, for meeting the demands from different structure design of LED backlight module, it can also add some constituting elements or members into the fifth embodiment of the LED backlight module structure, such that the LED backlight module structure may performs more functionality. As shown in FIG. 8, the solder paste overflow prevention members 17 are added into the fifth embodiment, and each solder paste overflow prevention member 17 consists of a bar-shaped solder paste overflow prevention member and a block-shaped solder paste overflow prevention member. Therefore, the solder paste overflow phenomenon can be prevented when using a pressing fixture 2 to assist in executing the welding process of the LED chips 13, and then it can make sure that the soldering pins of the LED chips 13 would not electrically connect to each other due to the solder paste overflow phenomenon. Besides, as shown in FIG. 10, the one bar-shaped solder paste overflow prevention member and the four block-shaped solder paste overflow prevention members may be integratedly formed to one H-shaped solder paste overflow prevention member. Furthermore, it can also add a reflector into the fifth embodiment for increasing the backlight efficiency.

Figure 21:
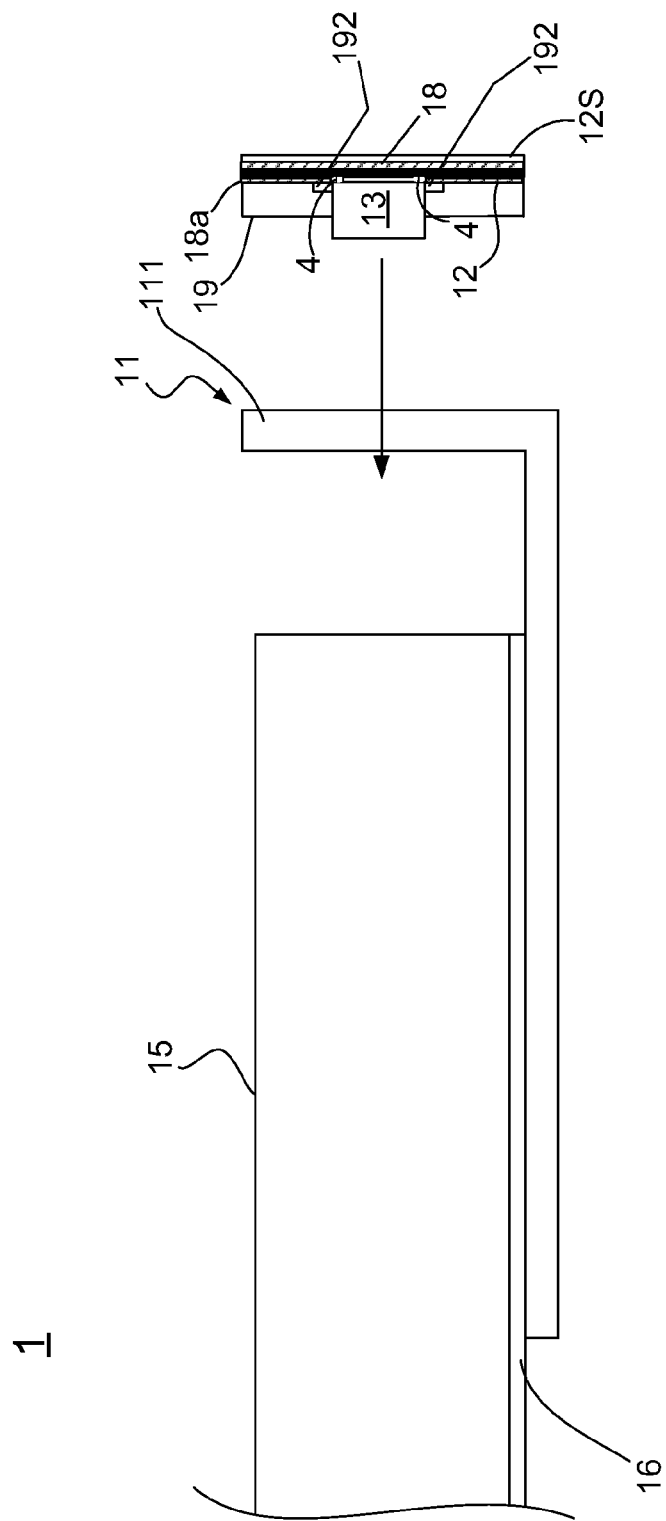
FIG. 21 is a side view of a sixth embodiment of an LED backlight module structure for increasing process yield according to the present invention.
Figure 22:
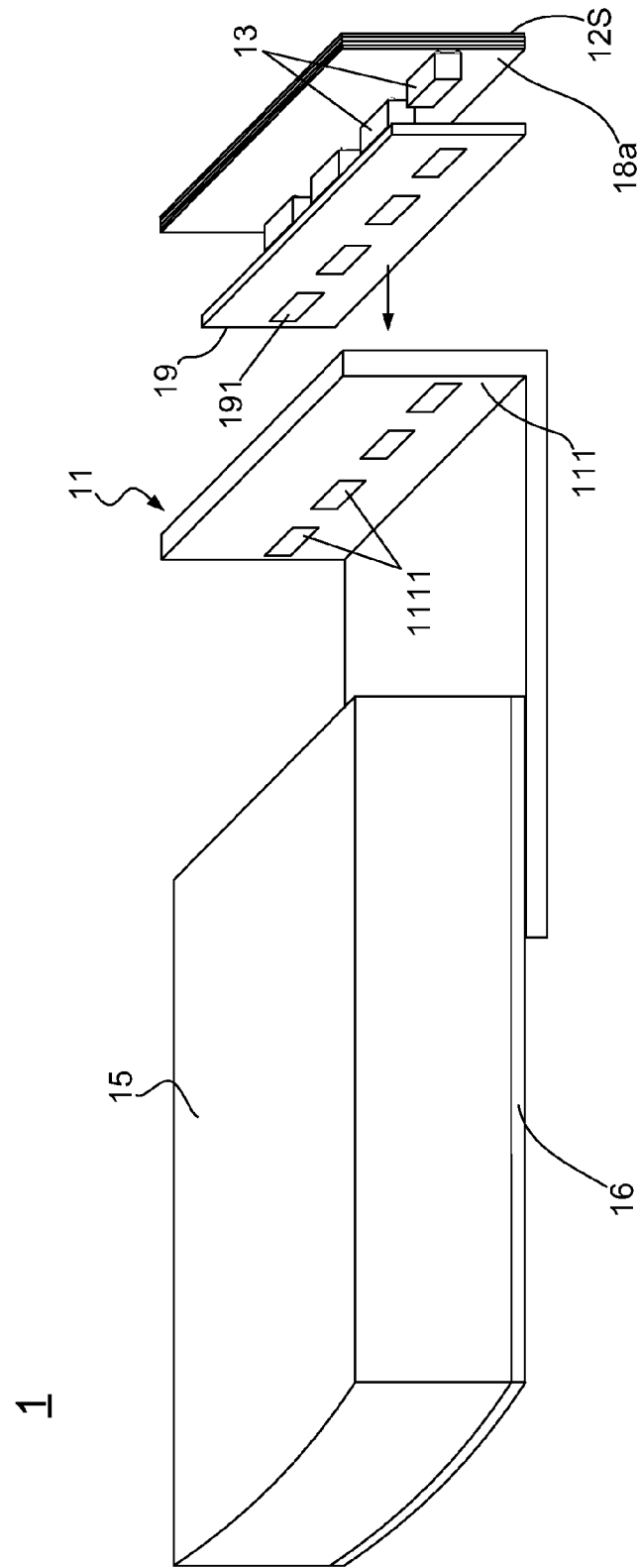
FIG. 22 is a stereo exploded view of the sixth embodiment of the LED backlight module structure for increasing process yield according to the present invention.

Finally, the present invention further provides a sixth embodiment of the LED backlight module structure 1. Please refer to FIG. 21 and FIG. 22, there are shown a side view and a stereo exploded view of the sixth embodiment of the LED backlight module structure for increasing process yield according to the present invention. As shown in FIG. 21 and FIG. 22, the sixth embodiment of the LED backlight module structure 1 includes: a housing 11, a circuit substrate 12S, a copper circuit layer 12, a plurality of LED chips 13, a position limiting band 19, a light guide plate 15, and a bottom reflector 16, In which, the aforesaid constituting elements of the sixth embodiment are all the same to the constituting elements of the fifth embodiment; However, differing from the fifth embodiment, the circuit substrate 12S, the copper circuit layer 12, the plurality of LED chips 13, and the position limiting band 19 are disposed in the exterior of the housing 11.

In the sixth embodiment, the housing 11 includes a circuit-disposing portion 111, and the circuit-disposing portion 111 having a plurality of disposing holes 111. The copper circuit layer 12 is disposed on the surface of the circuit substrate 12S through a thermally conductive insulating layer 18, wherein the copper circuit layer 12 has at least one main circuit 121 and a plurality of soldering point 122 (the main circuit 121 and the soldering points 122 are not shown in FIG. 21 and FIG. 22). The LED chips 13 are disposed on the copper circuit layer 12, and each LED chips 13 has a plurality of soldering pins and a light-emitting surface on the bottom and the top thereof, wherein the LED chips 13 are welded to the soldering points 122 by a solder 4.

Differing from the fifth embodiment, in the sixth embodiment, the circuit substrate 12S is attached to the outer surface of the circuit-disposing portion 111 via another thermally conductive insulating layer 18a, such that the LED chips 13 can respectively pass through the disposing holes 1111 and enter the interior of the housing 11 from the outer surface of the circuit-disposing portion 111. Besides, the position limiting band 19 includes: a plurality of position limiting holes 191, for receiving and fixing the LED chips 13, and a plurality of avoiding recesses 192, formed on the bottom of the inner wall of each position limiting hole 191 pairwise. Moreover, For aforesaid sixth embodiment, it is not limited to use the disposed the copper circuit layer 12 on the surface of the circuit substrate 12S. In the sixth embodiment, it can also directly attached the copper circuit layer 12 to the outer surface of the circuit-disposing portion 111 through the thermally conductive insulating layer 18, such that the LED chips 13 also respectively pass through the disposing holes 1111 and enter the interior of the housing 11 from the outer surface of the circuit-disposing portion 111. Thus, by this way, it can also finish the third embodiment of the LED backlight module structure without using the circuit substrate 12S and the another thermally conductive insulating layer 18a.

Similarly, for meeting the demands from different structure design of LED backlight module, it can also add some constituting elements or members into the fifth embodiment of the LED backlight module structure, such that the LED backlight module structure may performs more functionality. As shown in FIG. 17, the solder paste overflow prevention members 17 are added into the sixth embodiment, and each solder paste overflow prevention member 17 consists of a bar-shaped solder paste overflow prevention member and a block-shaped solder paste overflow prevention member. Therefore, the solder paste overflow phenomenon can be prevented when using a pressing fixture 2 to assist in executing the welding process of the LED chips 13, and then it can make sure that the soldering pins of the LED chips 13 would not electrically connect to each other due to the solder paste overflow phenomenon. Besides, as shown in FIG. 18, the one bar-shaped solder paste overflow prevention member and the four block-shaped solder paste overflow prevention members may be integratedly formed to one H-shaped solder paste overflow prevention member. Furthermore, it can also add a reflector into the sixth embodiment for increasing the backlight efficiency.

Therefore, the above descriptions have been clearly and completely introduced all of the embodiments of the LED backlight module structure for increasing process yield; in summary, the present invention has the following advantages:

1. In the first embodiment of the LED backlight module structure for increasing process yield according the present invention, a plurality of solder paste overflow prevention members 17 is disposed between the LED chips 13 and the copper circuit layer 12, therefore, the solder paste overflow phenomenon can be prevented when using a pressing fixture 2 to assist in executing the welding process of LED chips 13, and then it can make sure that the soldering pins of the LED chips 13 would not electrically connect to each other due to the solder paste overflow phenomenon.
2. In addition, for the second embodiment of the LED backlight module structure, it is completed by adding a position limiting band 19 into the first embodiment for receiving and fixing the LED chips 13, the position limiting band 19 is helpful to the LED chips 13 in heat dissipation when the LED chips 13 emit light.

3. Inheriting to above point 2, moreover, the position limiting band 19 further includes the avoiding recesses 192 formed on the bottom of the inner wall of each position limiting hole 191 pairwise; thus, when using the pressing fixture 2 to assist in executing the welding process of LED chips 13, it is able to avoid the solder paste overflow cause by the pressing fixture 2 from attaching to the position limiting band 19 and extendedly getting into the position limiting holes 191 of the position limiting band 19.

4. Moreover, for the demands from different structure design of LED backlight module, in the present invention, the third embodiment and the fourth embodiment are provided. In which, the constituting elements of the third embodiment and the fourth embodiment are all the same to the constituting elements of the first embodiment and the second embodiment; However, differing from the first embodiment and the second embodiment, the circuit substrate 12S, the copper circuit layer 12, the plurality of LED chips 13, the solder paste overflow prevention members 17, and the position limiting band 19 in the third embodiment and the fourth embodiment are disposed in the exterior of the housing 11.

5. Moreover, for the demands from different structure design of LED backlight module, in the present invention, the fifth embodiment is also provided. In which, a position limiting band 19 is disposed on the copper circuit layer 12 for receiving and fixing the LED chips 13, in addition, because the LED chips 13 clings to the inner walls of the position limiting hole 191 of the position limiting band 19, the position limiting band 19 is helpful to the LED chips 13 in heat dissipation when the LED chips 13 emit light.

6. Furthermore, in the present invention, the sixth embodiment is provided. In which, the aforesaid constituting elements of the sixth embodiment are all the same to the constituting elements of the fifth embodiment; However, differing from the fifth embodiment, the circuit substrate 12S, the copper circuit layer 12, the plurality of LED chips 13, and the position limiting band 19 are disposed in the exterior of the housing 11.

The above description is made on embodiments of the present invention. However, the embodiments are not intended to limit scope of the present invention, and all equivalent implementations or alterations within the spirit of the present invention still fall within the scope of the present invention.

I claim:

1. An Light-emitting diode (LED) backlight module structure for increasing process yield, comprising:
    a housing;
    a copper circuit layer, being disposed on the surface of a circuit-disposing portion of the housing through a thermally conductive insulating layer, wherein the copper circuit layer has at least one main circuit and a plurality of soldering point;
    a plurality of LED chips, having a plurality of soldering pins and a light-emitting surface on the bottoms and the tops thereof, wherein the plurality of LED chips are disposed on the copper circuit layer, and the soldering pins being welded to the soldering points;
    a plurality of solder paste overflow prevention members, being disposed between the LED chips and the copper circuit layer;
    a light guide plate, being disposed in the housing, and a light-receiving surface of the light guide plate being opposite to the light-emitting surfaces of the LED chips; and
    a bottom reflector, being disposed on the bottom of the light guide plate for preventing light leakage.

2. The LED backlight module structure for increasing process yield of claim 1, further comprising: a reflector, being disposed on the surface of the copper circuit layer and having a plurality of LED through holes for pass of the LED chips.

3. The LED backlight module structure for increasing process yield of claim 1, wherein the solder paste overflow prevention member comprises a bar-shaped solder paste overflow prevention member and four block-shaped solder paste overflow prevention members.

4. The LED backlight module structure for increasing process yield of claim 1, further comprising: a position limiting band, being disposed on the solder paste overflow prevention members and comprising:
    a plurality of position limiting holes, for receiving and fixing the LED chips; and
    a plurality of avoiding recesses, being formed on the bottom of the inner wall of each position limiting hole pairwise.

5. The LED backlight module structure for increasing process yield of claim 3, wherein the one bar-shaped solder paste overflow prevention member and the four block-shaped solder paste overflow prevention members may be integratedly formed to one H-shaped solder paste overflow prevention member.

6. The LED backlight module structure for increasing process yield of claim 1, wherein the housing is selected from the group consisting of: sheet metal housing and extrusion housing.

7. The LED backlight module structure for increasing process yield of claim 6, wherein the appearance of the said sheet metal housing is selected from the group consisting of: "⊓" shape and "L" shape.

8. The LED backlight module structure for increasing process yield of claim 1, wherein the material for making the solder paste overflow prevention member is selected from the group consisting of: heat-resistant adhesive tape, acrylic, silicone, and epoxy resin.

9. The LED backlight module structure for increasing process yield of claim 1, further comprising: a circuit substrate, being disposed on the circuit-disposing portion of the housing for bearing and carrying the thermally conductive insulating layer and the copper circuit layer.

10. The LED backlight module structure for increasing process yield of claim 9, wherein the material for making the circuit substrate is selected from the group consisting of: aluminum and fiberglass.

11. An Light-emitting diode (LED) backlight module structure for increasing process yield, comprising:
    a housing, having at least one circuit-disposing portion, and the circuit-disposing portion having a plurality of disposing holes;
    a circuit substrate;
    a copper circuit layer, being disposed on the surface of the circuit substrate through a thermally conductive insulating layer, wherein the copper circuit layer has at least one main circuit and a plurality of soldering point;
    a plurality of LED chips, having a plurality of soldering pins and a light-emitting surface on the bottoms and the tops thereof, wherein the plurality of LED chips are disposed on the copper circuit layer, and the soldering pins being welded to the soldering points;

moreover, the circuit substrate being attached to the outer surface of the circuit-disposing portion via another thermally conductive insulating layer, such that the LED chips respectively pass through the disposing holes and enter the interior of the housing from the outer surface of the circuit-disposing portion;

a plurality of solder paste overflow prevention members, being disposed between the LED chips and the copper circuit layer;

a light guide plate, being disposed in the housing, and a light-receiving surface of the light guide plate being opposite to the light-emitting surfaces of the LED chips; and a bottom reflector, being disposed on the bottom of the light guide plate for preventing light leakage.

12. The LED backlight module structure for increasing process yield of claim 11, further comprising: a reflector, being disposed on the surface of the copper circuit layer and having a plurality of LED through holes for pass of the LED chips.

13. The LED backlight module structure for increasing process yield of claim 11, wherein the solder paste overflow prevention member comprises a bar-shaped solder paste overflow prevention member and four block-shaped solder paste overflow prevention members.

14. The LED backlight module structure for increasing process yield of claim 11, further comprising: a position limiting band, being disposed on the solder paste overflow prevention members and comprising:
  a plurality of position limiting holes, for receiving and fixing the LED chips; and
  a plurality of avoiding recesses, being formed on the bottom of the inner wall of each position limiting hole pairwise.

15. The LED backlight module structure for increasing process yield of claim 13, wherein the one bar-shaped solder paste overflow prevention member and the four block-shaped solder paste overflow prevention members may be integratedly formed to one H-shaped solder paste overflow prevention member.

16. The LED backlight module structure for increasing process yield of claim 1, wherein the housing is selected from the group consisting of: sheet metal housing and extrusion housing.

17. The LED backlight module structure for increasing process yield of claim 16, wherein the appearance of the said sheet metal housing is selected from the group consisting of: "⊓" shape and "L" shape.

18. The LED backlight module structure for increasing process yield of claim 11, wherein the material for making the solder paste overflow prevention member is selected from the group consisting of: heat-resistant adhesive tape, acrylic, silicone, and epoxy resin.

19. The LED backlight module structure for increasing process yield of claim 11, wherein the material for making the circuit substrate is selected from the group consisting of: aluminum and fiberglass.

20. An Light-emitting diode (LED) backlight module structure for increasing process yield, comprising:
  a housing;
  a copper circuit layer, being disposed on the surface of a circuit-disposing portion of the housing through a thermally conductive insulating layer, wherein the copper circuit layer has at least one main circuit and a plurality of soldering point;
  a plurality of LED chips, having a plurality of soldering pins and a light-emitting surface on the bottoms and the tops thereof, wherein the plurality of LED chips are disposed on the copper circuit layer, and the soldering pins being welded to the soldering points;
  a position limiting band, being disposed on the copper circuit layer via another thermally conductive insulating layer, wherein the another thermally conductive insulating layer has a plurality of openings for exposing the soldering points of the copper circuit layer, and the position limiting band comprising:
    a plurality of position limiting holes, for receiving and fixing the LED chips; and
    a plurality of avoiding recesses, being formed on the bottom of the inner wall of each position limiting hole pairwise;
  a light guide plate, being disposed in the housing, and a light-receiving surface of the light guide plate being opposite to the light-emitting surfaces of the LED chips; and
  a bottom reflector, being disposed on the bottom of the light guide plate for preventing light leakage.

21. The LED backlight module structure for increasing process yield of claim 20, further comprising: a reflector, being disposed on the surface of the copper circuit layer and having a plurality of LED through holes for pass of the LED chips.

22. The LED backlight module structure for increasing process yield of claim 20, further comprising: a plurality of solder paste overflow prevention members, being disposed between the LED chips and the copper circuit layer.

23. The LED backlight module structure for increasing process yield of claim 22, wherein the solder paste overflow prevention member comprises a bar-shaped solder paste overflow prevention member and four block-shaped solder paste overflow prevention members.

24. The LED backlight module structure for increasing process yield of claim 23, wherein the one bar-shaped solder paste overflow prevention member and the four block-shaped solder paste overflow prevention members may be integratedly formed to one H-shaped solder paste overflow prevention member.

25. The LED backlight module structure for increasing process yield of claim 1, wherein the housing is selected from the group consisting of: sheet metal housing and extrusion housing.

26. The LED backlight module structure for increasing process yield of claim 25, wherein the appearance of the said sheet metal housing is selected from the group consisting of: "⊓" shape and "L" shape.

27. The LED backlight module structure for increasing process yield of claim 22, wherein the material for making the solder paste overflow prevention member is selected from the group consisting of: heat-resistant adhesive tape, acrylic, silicone, and epoxy resin.

28. The LED backlight module structure for increasing process yield of claim 20, further comprising: a circuit substrate, being disposed on the circuit-disposing portion of the housing for bearing and carrying the thermally conductive insulating layer and the copper circuit layer.

29. The LED backlight module structure for increasing process yield of claim 28, wherein the material for making the circuit substrate is selected from the group consisting of: aluminum and fiberglass.

30. An Light-emitting diode (LED) backlight module structure for increasing process yield, comprising:
- a housing, having at least one circuit-disposing portion, and the circuit-disposing portion having a plurality of disposing holes;
- a circuit substrate;
- a copper circuit layer, being disposed on the surface of the circuit substrate through a thermally conductive insulating layer, wherein the copper circuit layer has at least one main circuit and a plurality of soldering point;
- a plurality of LED chips, having a plurality of soldering pins and a light-emitting surface on the bottoms and the tops thereof, wherein the plurality of LED chips are disposed on the copper circuit layer, and the soldering pins being welded to the soldering points; moreover, the circuit substrate being attached to the outer surface of the circuit-disposing portion via another thermally conductive insulating layer, such that the LED chips respectively pass through the disposing holes and enter the interior of the housing from the outer surface of the circuit-disposing portion;
- a position limiting band, being disposed on the copper circuit layer via another thermally conductive insulating layer, wherein the another thermally conductive insulating layer has a plurality of openings for exposing the soldering points of the copper circuit layer, and the position limiting band comprising:
    - a plurality of position limiting holes, for receiving and fixing the LED chips; and
    - a plurality of avoiding recesses, being formed on the bottom of the inner wall of each position limiting hole pairwise;
- a light guide plate, being disposed in the housing, and a light-receiving surface of the light guide plate being opposite to the light-emitting surfaces of the LED chips; and
- a bottom reflector, being disposed on the bottom of the light guide plate for preventing light leakage.

31. The LED backlight module structure for increasing process yield of claim 30, further comprising: a reflector, being disposed on the surface of the copper circuit layer and having a plurality of LED through holes for pass of the LED chips.

32. The LED backlight module structure for increasing process yield of claim 30, further comprising: a plurality of solder paste overflow prevention members, being disposed between the LED chips and the copper circuit layer.

33. The LED backlight module structure for increasing process yield of claim 32, wherein the solder paste overflow prevention member 17 comprises a bar-shaped solder paste overflow prevention member and four block-shaped solder paste overflow prevention members.

34. The LED backlight module structure for increasing process yield of claim 33, wherein the one bar-shaped solder paste overflow prevention member and the four block-shaped solder paste overflow prevention members may be integratedly formed to one H-shaped solder paste overflow prevention member.

35. The LED backlight module structure for increasing process yield of claim 30, wherein the housing is selected from the group consisting of: sheet metal housing and extrusion housing.

36. The LED backlight module structure for increasing process yield of claim 35, wherein the appearance of the said sheet metal housing is selected from the group consisting of: "⊓" shape and "L" shape.

37. The LED backlight module structure for increasing process yield of claim 32, wherein the material for making the solder paste overflow prevention member is selected from the group consisting of: heat-resistant adhesive tape, acrylic, silicone, and epoxy resin.

38. The LED backlight module structure for increasing process yield of claim 30, wherein the material for making the circuit substrate is selected from the group consisting of: aluminum and fiberglass.

* * * * *